United States Patent
Inui

(10) Patent No.: US 6,722,837 B2
(45) Date of Patent: Apr. 20, 2004

(54) LOAD STORAGE EQUIPMENT

(75) Inventor: Yoshitaka Inui, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 73 days.

(21) Appl. No.: 10/235,037

(22) Filed: Sep. 3, 2002

(65) Prior Publication Data

US 2003/0059284 A1 Mar. 27, 2003

(30) Foreign Application Priority Data

Aug. 31, 2001 (JP) ........................................ 2001-262584

(51) Int. Cl.[7] ................................................. B65G 1/12
(52) U.S. Cl. ............................. 414/331.05; 414/331.02
(58) Field of Search ....................... 414/331.02, 331.05, 414/331.08, 331.11, 331.14; 198/347.1, 347.2

(56) References Cited

U.S. PATENT DOCUMENTS

| | | | | |
|---|---|---|---|---|
| 2,873,020 A | * | 2/1959 | Kay | .......................... 198/347.1 |
| 3,700,121 A | * | 10/1972 | McManus | .............. 414/331.02 |
| 5,568,850 A | * | 10/1996 | Neber | ...................... 198/347.1 |
| 6,663,332 B1 | * | 12/2003 | Sluijk et al. | ........... 414/331.05 |

* cited by examiner

Primary Examiner—James R. Bidwell
(74) Attorney, Agent, or Firm—Goodwin Procter LLP

(57) ABSTRACT

There is provided compact load storage equipment that can store a large number of loads. The storage equipment comprises a rotary rack 21, a transferrer 51, one or more fixed racks 101, an inlet port 111a and an outlet port 111b. The rotary rack 21 is supported rotatably about a first vertical axis and includes a number of vertically arranged stages of turning load supports 32. The transferrer 51 adjoins the rotary rack 21 and includes a carrier 81, which can vertically move and rotate about a second vertical axis. The fixed racks 101 are positioned around the transferrer 51 and each includes a number of vertically arranged stages of fixed load supports 103. In plan view, the ports 111a and 111b each overlap with one of the rotary and fixed racks 21 and 101. The transferrer 51 can transfer loads between the carrier 81 and any one of the turning and fixed load supports 32 and 103, and between the carrier 81 and each of the ports 111a and 111b, by the turning and vertical movement of the carrier 81, or by the combination of the turning and vertical movement of the carrier 81 and the turning of the turning load supports 32.

18 Claims, 16 Drawing Sheets

FIG.15
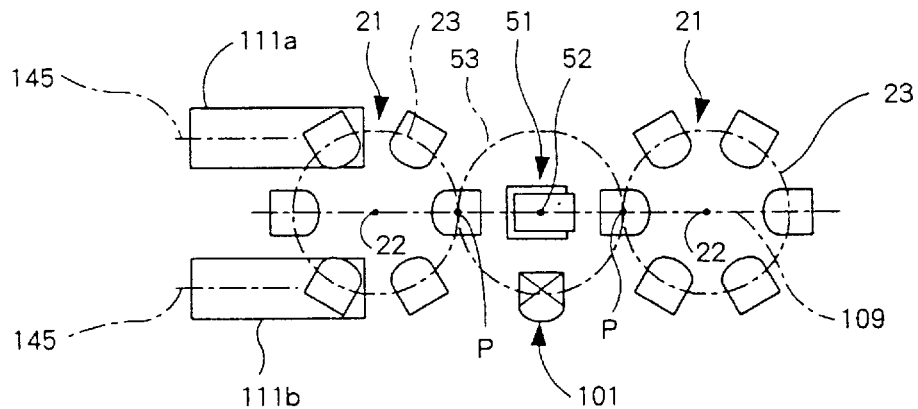
(a)
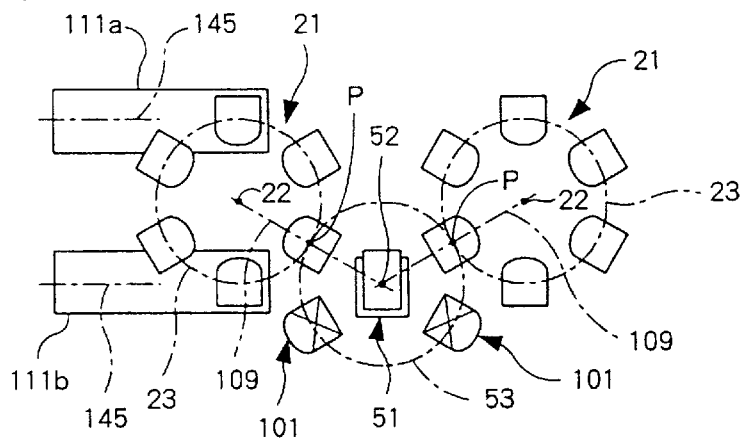
(b)
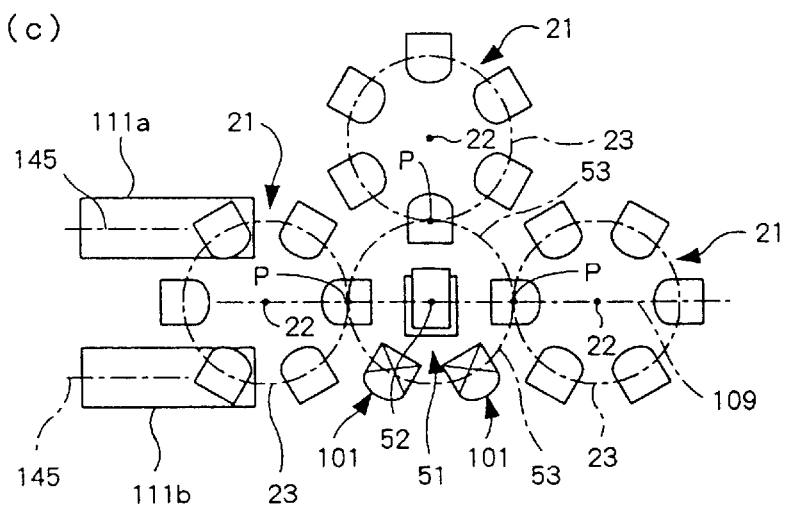
(c)

FIG.16
(a)
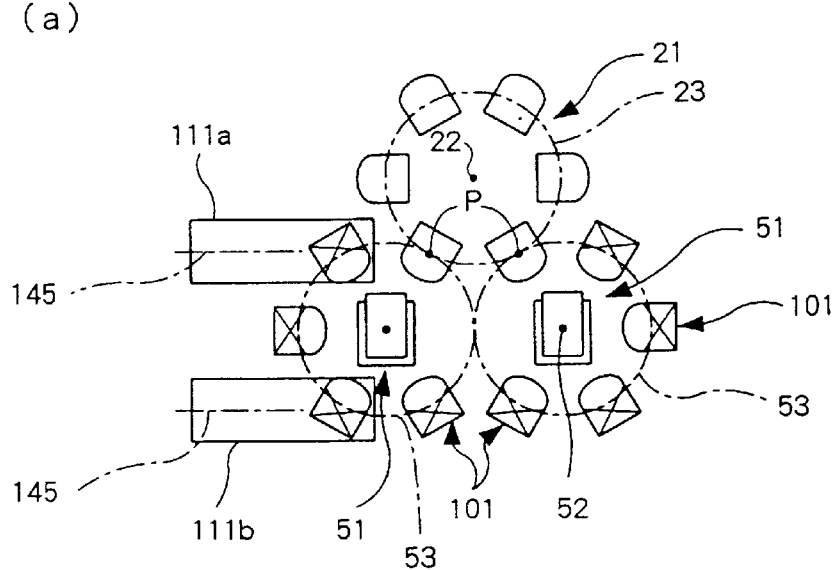
(b)
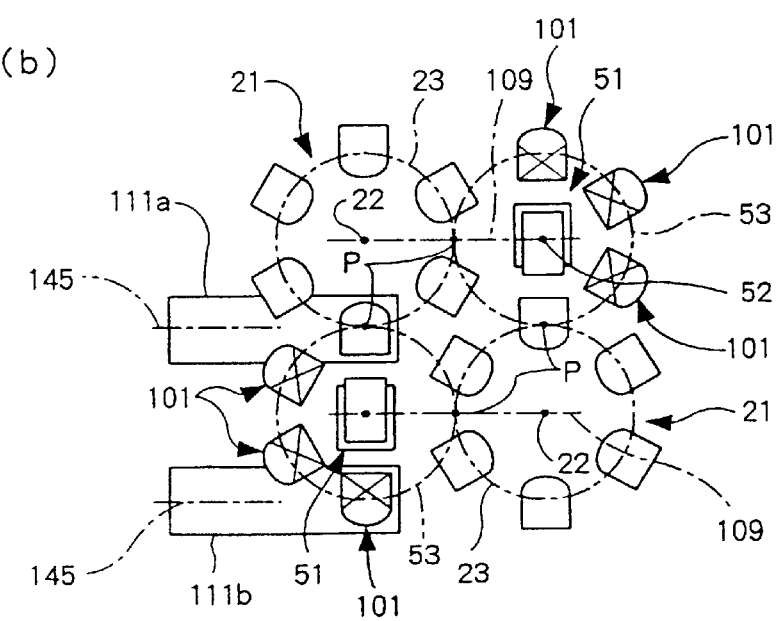

LOAD STORAGE EQUIPMENT

FIELD OF THE INVENTION

The present invention relates to load storage equipment for storing loads.

PRIOR ART

Japanese Patent Laid-Open Publication No. H10-279,023 discloses a prior art automatic warehouse as load storage equipment. The warehouse is fitted with a pair of fixed racks extending in parallel and spaced from each other. Each of the fixed racks has a number of storage spaces or partitions arranged vertically and horizontally. The fixed racks define a traveling path between them. The warehouse is also fitted with a transferrer, which travels along the traveling path. The warehouse is further fitted with a pair of rotary racks, each of which is supported at one end of the path. Each of the rotary racks includes a number of storage spaces or partitions arranged vertically and circumferentially. The transferrer consists of a carriage, a pair of horizontal rails and a rail lifter. The carriage supports a turntable, which supports an arm, a hand or other means of transfer for transferring loads between the storage spaces of the fixed and rotary racks. The carriage can travel on the rails, which extend along the traveling path between the fixed racks. One of the fixed racks supports the rails, which can be moved vertically by a rail driver.

Loads can be transferred among the fixed and rotary racks by the combination of the vertical movement of the rails, the travel of the carriage, the turning of the turntable, and the operation of the means of transfer. The transfer of loads to and from the rotary racks involves turning these racks suitably.

In order to increase the number of loads that can be stored in the fixed racks, it is necessary to increase the storage spaces in number by making these racks higher or longer. If the storage equipment is installed in a room or house small in scale or size, however, the fixed racks cannot be enlarged. For example, if the storage equipment is installed in a special room such as a clean room, which is limited in size, it is not easy for the equipment to have large fixed racks.

SUMMARY OF THE INVENTION

The primary object of the present invention is to provide compact load storage equipment that can store a large number of loads, and into which loads can be easily placed, and out of which loads can be easily taken.

Load storage equipment according to the present invention comprises a rotary rack, a transferrer, a fixed rack and an inlet-outlet port. The rotary rack includes a number of vertically arranged stages of turning load supports, which can rotate around a first vertical axis. The transferrer is positioned side by side with the rotary rack and includes a carrier, which can turn on a second vertical axis and move vertically. The fixed rack is positioned in a space around the transferrer and includes a number of vertically arranged stages of fixed load supports. The inlet-outlet port overlaps with one of the rotary and fixed racks (vertically) in plan view. The transferrer can transfer loads between the carrier and any one of the turning and fixed load supports, and between the carrier and the inlet-outlet port, by means of the turning and vertical movement of the carrier, or by means of the combination of the turning and vertical movement of the carrier and the turning of the turning load supports.

The carrier of the transferrer can receive a load from the inlet-outlet port. It is possible to load the received load onto any one of the turning load supports by turning the rotary rack to shift this load support to a transfer position between the rack and the transferrer, turning and/or vertically moving the carrier to shift it to a position near the load support in the transfer position, as the need arises, and activating the shifted carrier to transfer the received load onto the load support. It is also possible to load the received load onto any one of the fixed load supports by turning and/or vertically moving the carrier to shift it to a position near the load support, as the need arises, and activating the shifted carrier to transfer the received load onto the load support.

By reversing the loading processes, it is possible to unload a load from any one of the turning and fixed load supports and carry the unloaded load to the inlet-outlet port by means of the carrier of the transferrer. It is also possible to unload a load from any one of the turning and fixed load supports and reload the unloaded load onto another turning or fixed load support by means of the carrier.

As stated above, the single transferrer can load and unload both the rotary and fixed racks. Differently from the prior art, the carrier of the transferrer does not travel along the fixed rack, but turns and moves vertically. Accordingly, the carrier does not require a large space to travel. The carrier is important in loading and unloading the rotary rack. The fixed rack may be positioned in a space around the transferrer. By making the carrier rotatable on the second vertical axis, it is possible to load and unload the fixed rack by means of the transferrer. Because the transferrer does not need to travel, the carrier can move downward near the floor so that the rotary and fixed racks may include additional stages of turning and fixed load supports respectively near the floor to store more loads. Because the inlet-outlet port overlaps with one of the rotary and fixed racks in plan view, there is no need for an exclusive space in plan view for the port.

Thus, the rotary and fixed racks can store a large number of loads, while the storage equipment can be simple and compact. It will accordingly be understood that the storage equipment can be built or placed suitably in a clean room or another special or dimensionally limited space.

It is preferable that the inlet-outlet port should overlap with the fixed rack in plan view in such a manner that loads can be transferred directly between the port and the carrier of the transferrer.

If the inlet-outlet port overlaps with the rotary rack in plan view, one or more of the stages of turning load supports would need removal so as not to interfere with the port. It is preferable that two or more fixed racks be arranged around the transferrer. If the inlet-outlet port overlaps with one of the fixed racks, the port is positioned in the portion of this rack where one or more fixed load supports would otherwise be positioned. The other fixed racks are full of stages of fixed load supports. In this case, more loads can be stored than in the case of the inlet-outlet port overlapping with the rotary rack. If the inlet-outlet port overlaps with the rotary rack, no load could be transferred directly between the port and the transferrer, and another transferrer may be needed for relaying loads between them. If the inlet-outlet port overlaps with one of the fixed racks, loads can be transferred directly between the port and the carrier of the transferrer, and there is no need of a relay transferrer.

It is preferable that the fixed rack should include at least two fixed racks. At least one of the fixed racks is positioned on each side of the vertical plane on which the first and second vertical axes extend. It is also preferable that the inlet-outlet port should include an inlet port and an outlet port, each of which overlaps with one of the fixed racks in plan view. The inlet and outlet ports are arranged in parallel with each other in such a manner that loads can be carried through them in directions parallel to the vertical plane.

The inlet and outlet ports can be positioned side by side in an end portion of the storage equipment in plan view. This makes it possible to arrange the inlet and outlet ports and other equipment components, and to conveniently provide a conveyor for conveying loads to the inlet port and from the outlet port, in comparison with load storage equipment including an inlet port and an outlet port that extend radially to the turning axis of a transferrer.

An inner end portion of each of the inlet and outlet ports may overlap with the associated fixed rack in plan view. A load in the inner end portion of each port can be shifted between an angular position parallel with the vertical plane and an angular position where the load can be transferred between the port and the carrier of the transferrer. This makes it possible to carry loads in the same angular position, which is parallel with the vertical plane, through the inlet and outlet ports. Consequently, a conveyor for conveying loads to the inlet port and from the outlet port can be provided conveniently, and loads can be carried conveniently through the ports. Additionally, the carrier of the transferrer is simple in structure, as compared with a case where the angular position of a load needs shifting on a carrier that needs turning and vertically moving.

The transferrer may include a fixed post, a lift and a turner. The lift can move vertically along the fixed post. The turner is supported by the lift and rotatable on the second vertical axis. The turner supports the carrier in such a manner that the carrier can protrude and retract radially from the second vertical axis. A load can be transferred between the carrier and each of the turning and fixed load supports by the protrusion, retraction and vertical movement of the carrier.

In this case, the rotational driver and bearing of the transferrer are less burdened, and the transferrer is stable, safe, and easy to make, as compared with a case where the entire transferrer, inclusive of the fixed post, would otherwise be supported rotatably on the second vertical axis. Additionally, the transferrer may take the form of a running fork for its transfer operation. The transferrer in this form does not require that a load be fitted with a special part enabling it to be transferred. The transferrer in this form can safely transfer any load having a bottom that can be supported stably on the transferrer. The transferrer in this form is simple in structure.

The carrier of the transferrer may include a horizontal plate. Each of the turning and fixed load supports may be a shelf having a recess, through which the carrier can move vertically when it has protruded. Each of the turning load supports may have a first positioning pin protruding upward from it. The carrier may have a second positioning pin protruding upward from it. Each of the fixed load supports may have a third positioning pin protruding upward from it. Each of the loads may have a bottom with an engaging means for engaging with the positioning pins.

When the carrier of the transferrer turns, protrudes and retracts with a load on it, and when the rotary rack turns with loads each on one of the turning load supports, inertia acts on the loads. The positioning pins engaging with the loads prevent the loads from being transferred abnormally by shifting out of position due to the inertia, an earthquake, agitation, vibration or the like. The positioning pins also prevent loads from falling from the rotary and fixed racks and the transferrer. This makes the storage equipment safer.

The second positioning pin may stand on a peripheral portion of the carrier of the transferrer. Each of the first and third positioning pins may stand in a position that is near to the second positioning pin when the carrier is positioned in the recess of the associated load support. The engaging means of each load may be a bottom slot for engaging with the second positioning pin and one of the first and third positioning pins at the same time.

Each load can be positioned in place with its bottom slot engaging with one or two of the positioning pins. The bottom slot makes it possible to reduce the number of engaging means that need providing at the bottom of each load. Accordingly, bottom slots are easy to form in various types of load.

The shelves of the rotary and fixed racks may be identical in shape, and the first and third positioning pins may be identical in shape. In this case, each of the turning and fixed load supports can be the same type of shelf with a positioning pin, and consequently the production cost can be reduced.

The rotary and fixed racks and the transferrer may be positioned in a storage chamber defined in a housing. Loads can be carried through the inlet-outlet port between the storage chamber and a clean room outside the chamber. The storage chamber can effectively store the loads carried from the clean room.

BRIEF DESCRIPTION OF THE DRAWINGS

FIG. 15(a) is a schematic top plan of load storage equipment according to a second embodiment of the present invention.

FIG. 15(b) is a schematic top plan of load storage equipment according to a third embodiment of the present invention.

FIG. 15(c) is a schematic top plan of load storage equipment according to a fourth embodiment of the present invention.

FIG. 16(a) is a schematic top plan of load storage equipment according to a fifth embodiment of the present invention.

FIG. 16(b) is a schematic top plan of load storage equipment according to a sixth embodiment of the present invention.

EXEMPLARY EMBODIMENTS

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

FIGS. 1–14 show load storage equipment 10 according to a first embodiment of the present invention.

Figure 1:
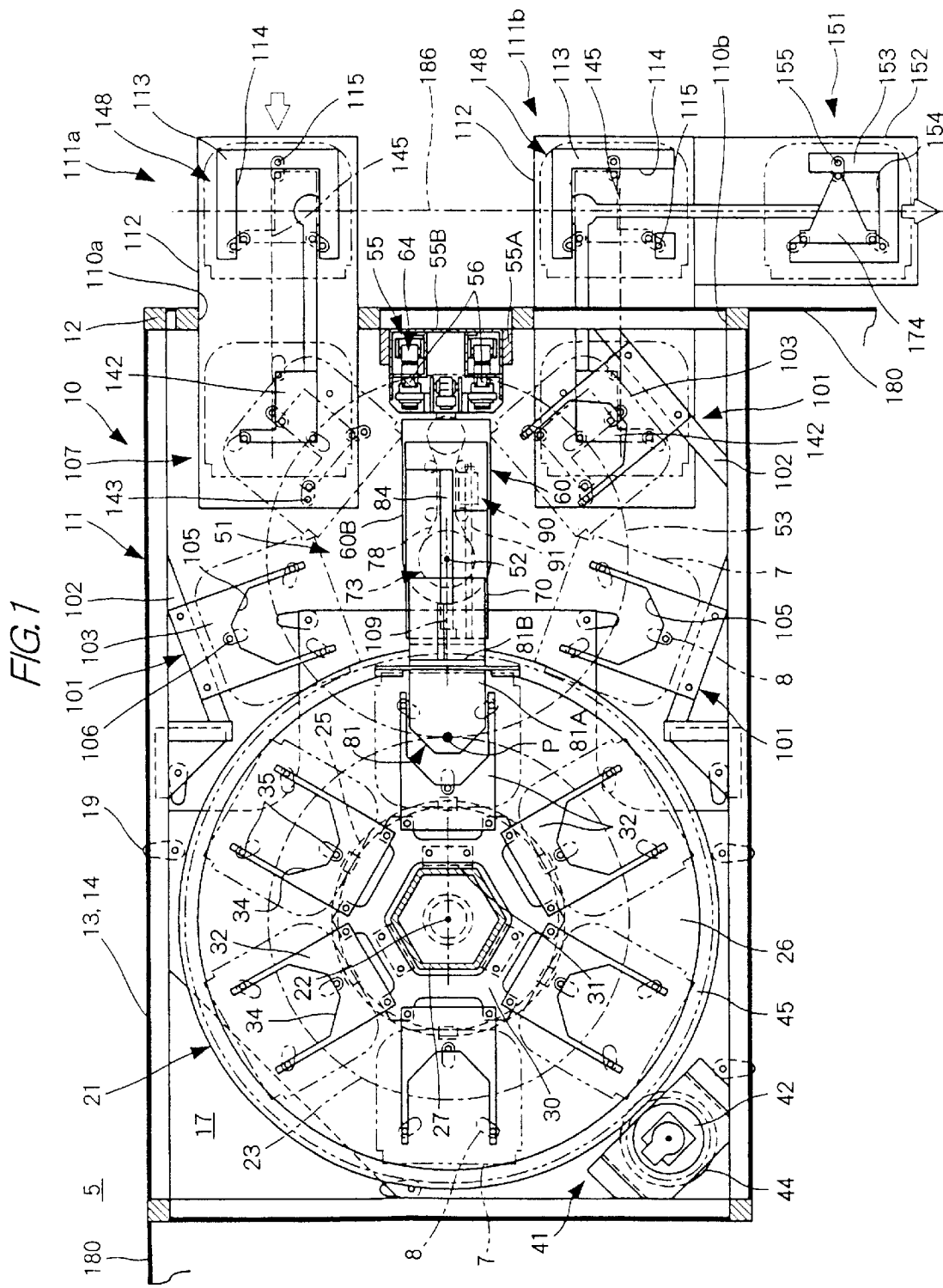
FIG. 1 is a top plan in horizontal section of load storage equipment according to a first embodiment of the present invention.
Figure 2:
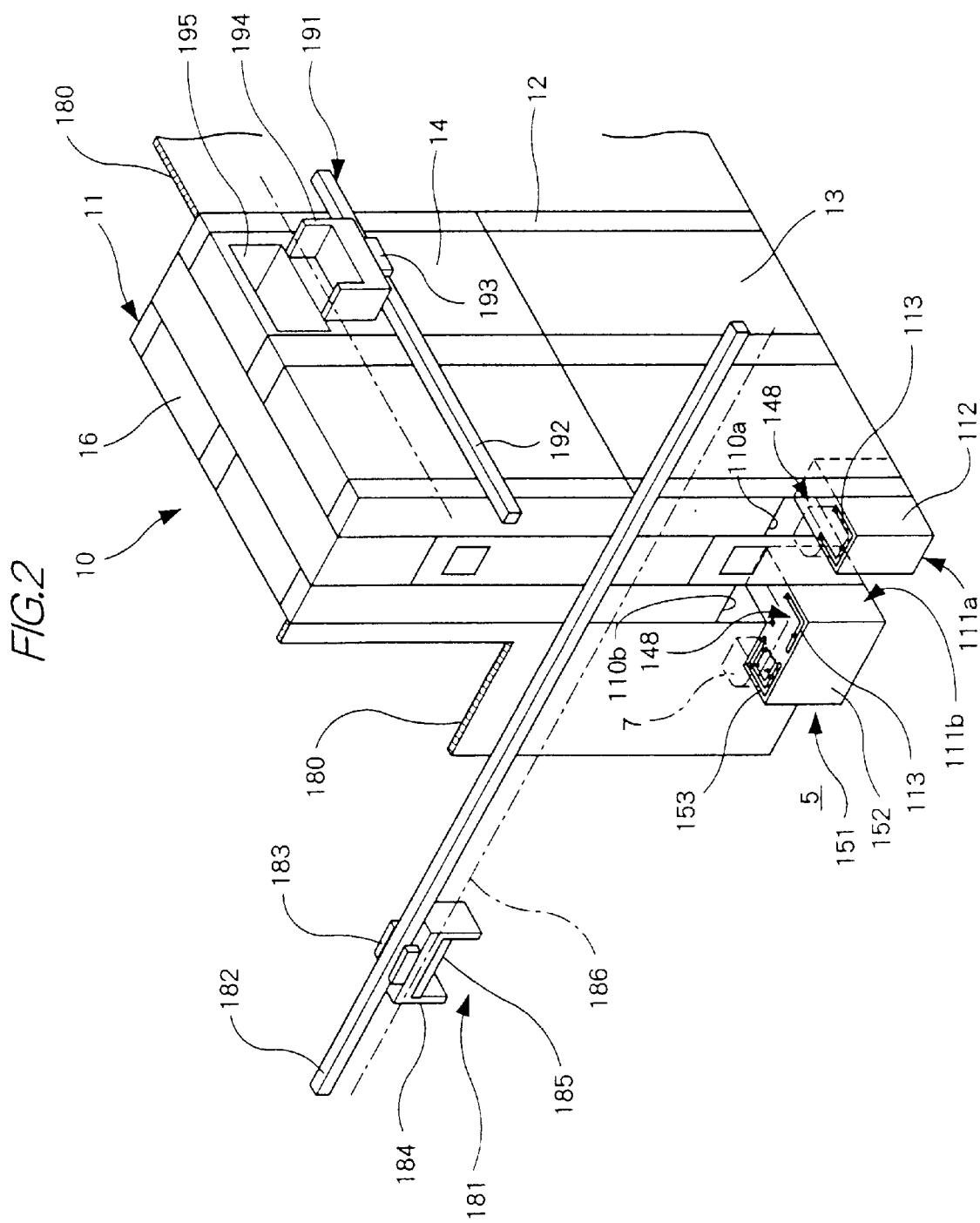
FIG. 2 is a perspective view of part of the storage equipment.
Figure 3:
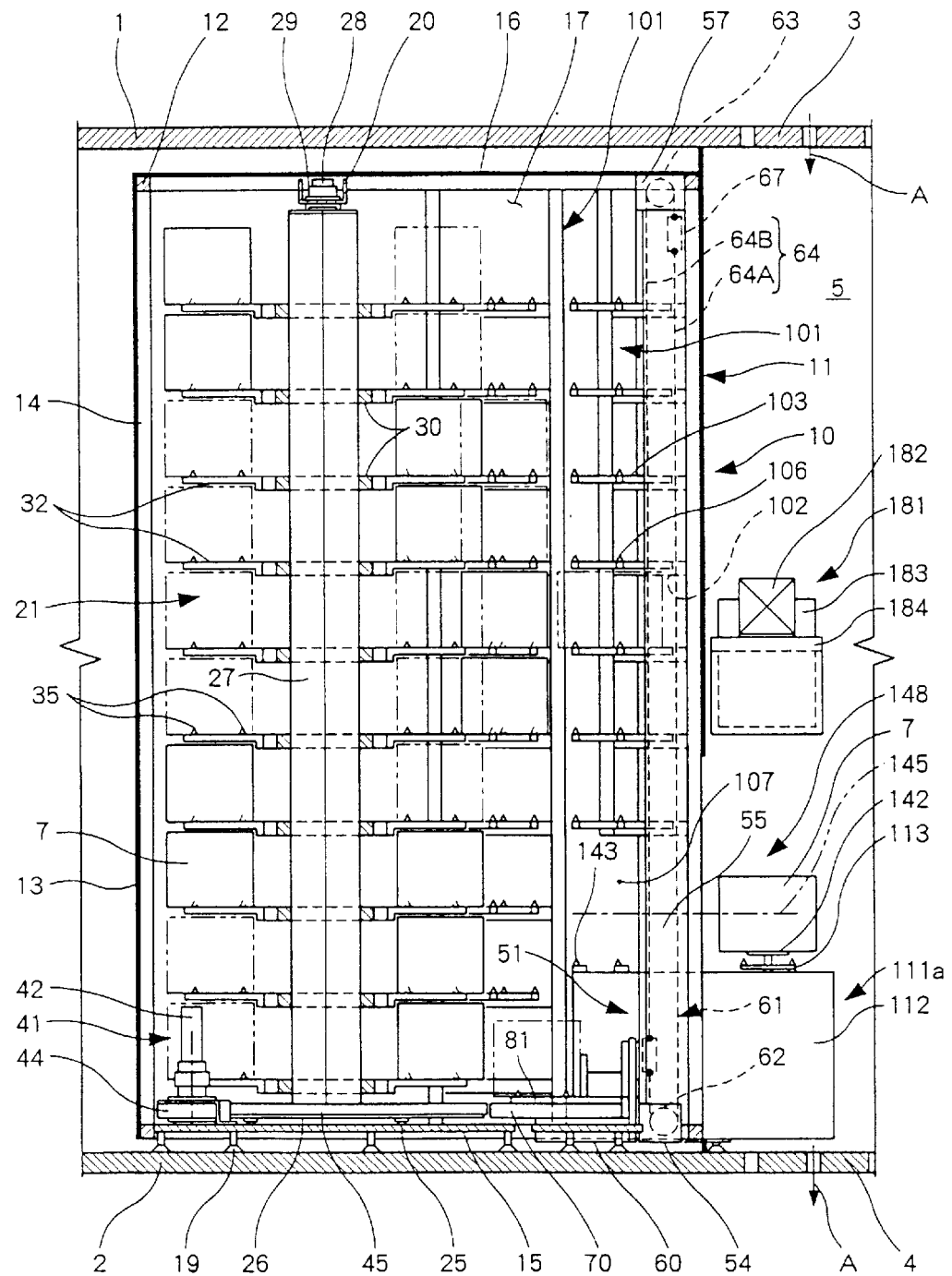
FIG. 3 is a side view in vertical section of the storage equipment.
Figure 4:
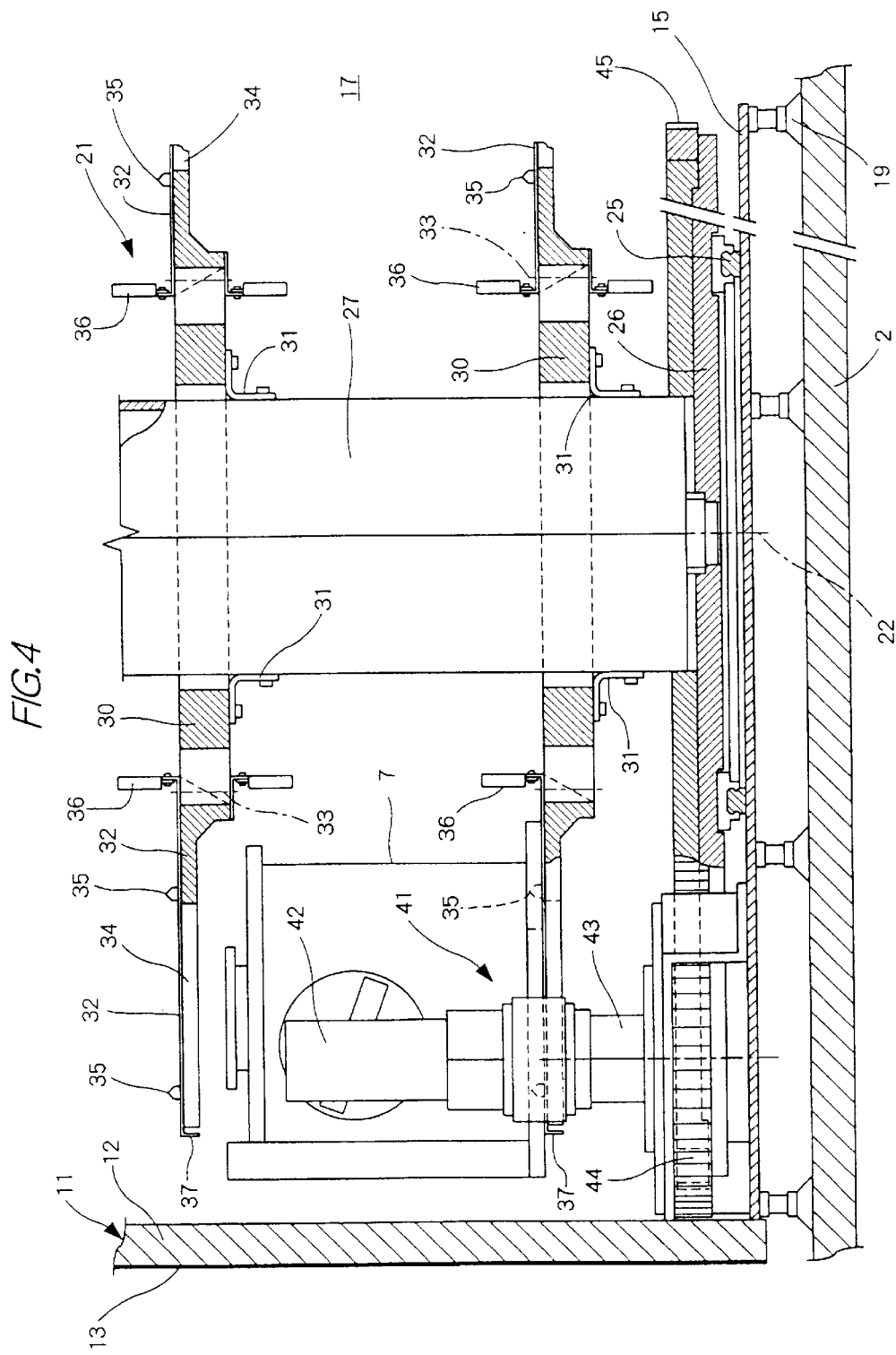
FIG. 4 is a side view partially in section of a lower portion of the rotary rack of the storage equipment.

As shown in FIGS. 1–3, the storage equipment 10 includes a housing 11 in the form of a rectangular box. The storage equipment 10 also includes a rotary rack 21, a transferrer 51 and four fixed racks 101, all of which are fitted in the housing 11. The storage equipment 10 further includes an inlet port 111a and an outlet port 111b, which extend through a wall of the housing 11.

The housing 11 defines a storage chamber or space 17 in it and includes a framework 12, a lower wall 13, an upper wall 14, a base plate 15 and a top plate 16. The walls 13 and 14 surround the lower and upper halves respectively of the framework 12. The plates 15 and 16 are fixed to the bottom and top respectively of the framework 12. At least part of the walls 13 and 14, mainly the upper wall 14, may be one or more transparent plates made of resin or the like, through which it is possible to observe the condition of the storage chamber 17. The base plate 15 may be supported by legs 19 standing on a floor 2.

The rotary rack 21 and the transferrer 51 are positioned in the storage chamber 17, each near one side of this chamber.

With reference to FIGS. 1 and 3–5, the rotary rack 21 is supported rotatably on a vertical axis 22. The rotary rack 21 has a cylindrical path 23 coaxial with the vertical axis 22. The rotary rack 21 includes a number of vertically arranged stages of turning shelves 32, which are arranged circumferentially at regular intervals on the cylindrical path 23.

The base plate 15 supports a turntable 26 with a circular guide rail 25 interposed between them. The guide rail 25 and the turntable 26 are coaxial with the vertical axis 22. The turntable 26 supports a hollow column 27 standing on it, which is closed at its top with a closing plate 27A. In the present embodiment, hollow column 27 is hexagonal. However, other suitably shaped columns may be used. A vertical pin 28 stands on the center of the closing plate 27A. The housing 11 is fitted with a supporting member 20 at its top, which supports the vertical pin 28 with a bearing 29 interposed between them. This makes the hexagonal column 27 rotatable on the vertical axis 22.

The hexagonal column 27 is fitted with a number of hexagonal plates 30 around it at vertical intervals. Each of the hexagonal plates 30 is fixed to the hexagonal column 27 by means of fixtures 31. Each of the hexagonal plates 30 supports, in this embodiment, six of the turning shelves 32 each at one of its six peripheral sides. One end of each turning shelf 32 is fixed to the associated hexagonal plate 30 with connectors 33 in such a manner that the shelves 32 protrude in the form of cantilevers around the hexagonal column 27 radially of the vertical axis 22.

Each of the turning shelves 32 is a horizontal plate with a recess 34, which is open outward radially of the vertical axis 22. Each turning shelf 32 is fitted with three positioning pins 35 on its upper side around the associated recess 34. Each turning shelf 32 is also fitted with reflecting plates 36 as part of a load detector on its fixed end. Each turning shelf 32 is further fitted with a reflector 37 as part of a level detector on one of its free ends.

The rotary rack 21 can be turned by a rack driver 41, which consists of a rotational drive 42, a driving gear 44 and a ring gear 45. The rotational drive 42 is mounted on a corner of the base plate 15 of the housing 11 and includes a driving shaft 43 extending downward from it. The driving shaft 43 is fitted with a driving gear 44. The turntable 26 is fitted with a ring gear 45 around it, which is in mesh with the driving gear 44. The rotational drive 42 includes a motor and a speed reducer and can turn the driving shaft 43 in both directions.

The turning of the driving shaft 43 in both directions by means of the rotational drive 42 turns the rotary rack 21 in both directions on the vertical axis 22 through the gears 44 and 45. The rotary rack 21 is controlled to turn within an angular range of 180 degrees. The parts and/or components 24–45 compose the rotary rack 21, which may consist of other parts and/or components.

With reference to FIGS. 1, 3 and 6–8, the transferrer 51 includes a carrier 81, which is supported in such a manner that it can turn on a vertical axis 52 and move vertically.

Figure 7:
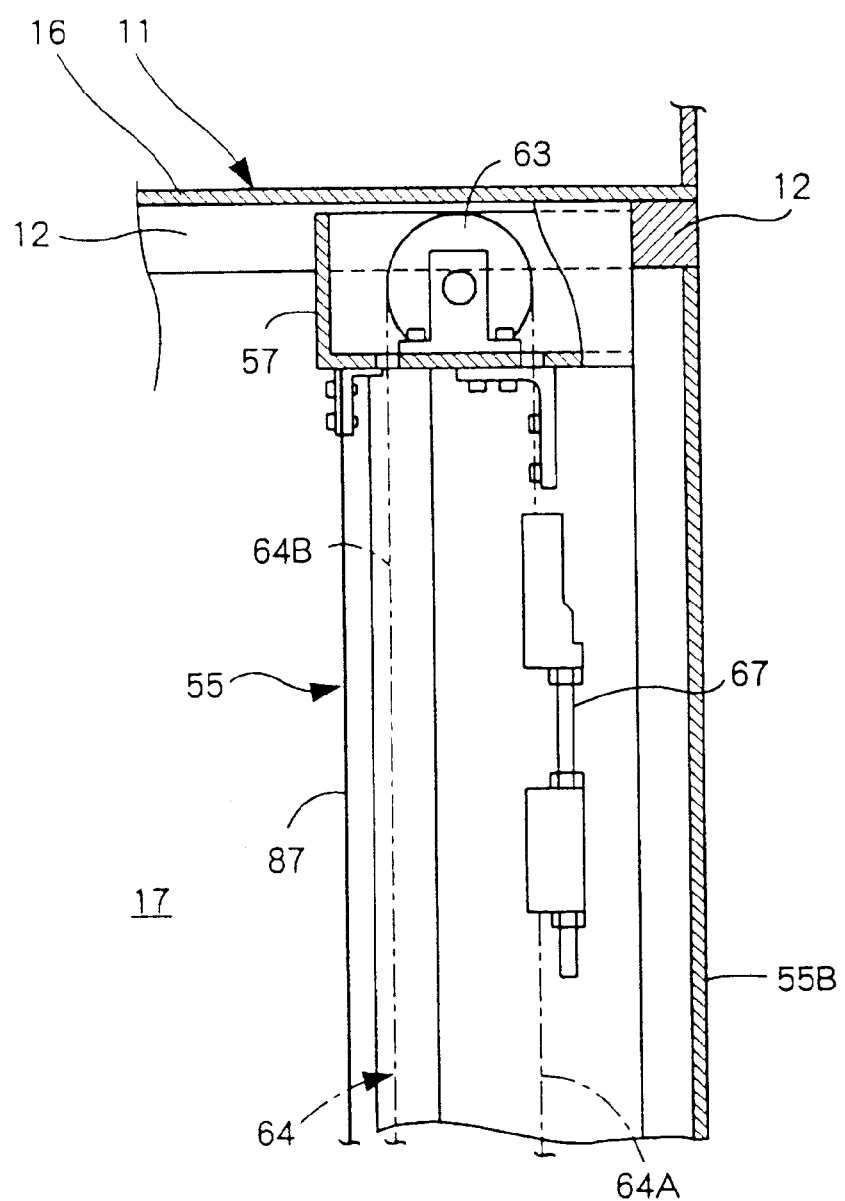
FIG. 7 is a side view partially in section of an upper portion of the transferrer of the storage equipment.
Figure 8:
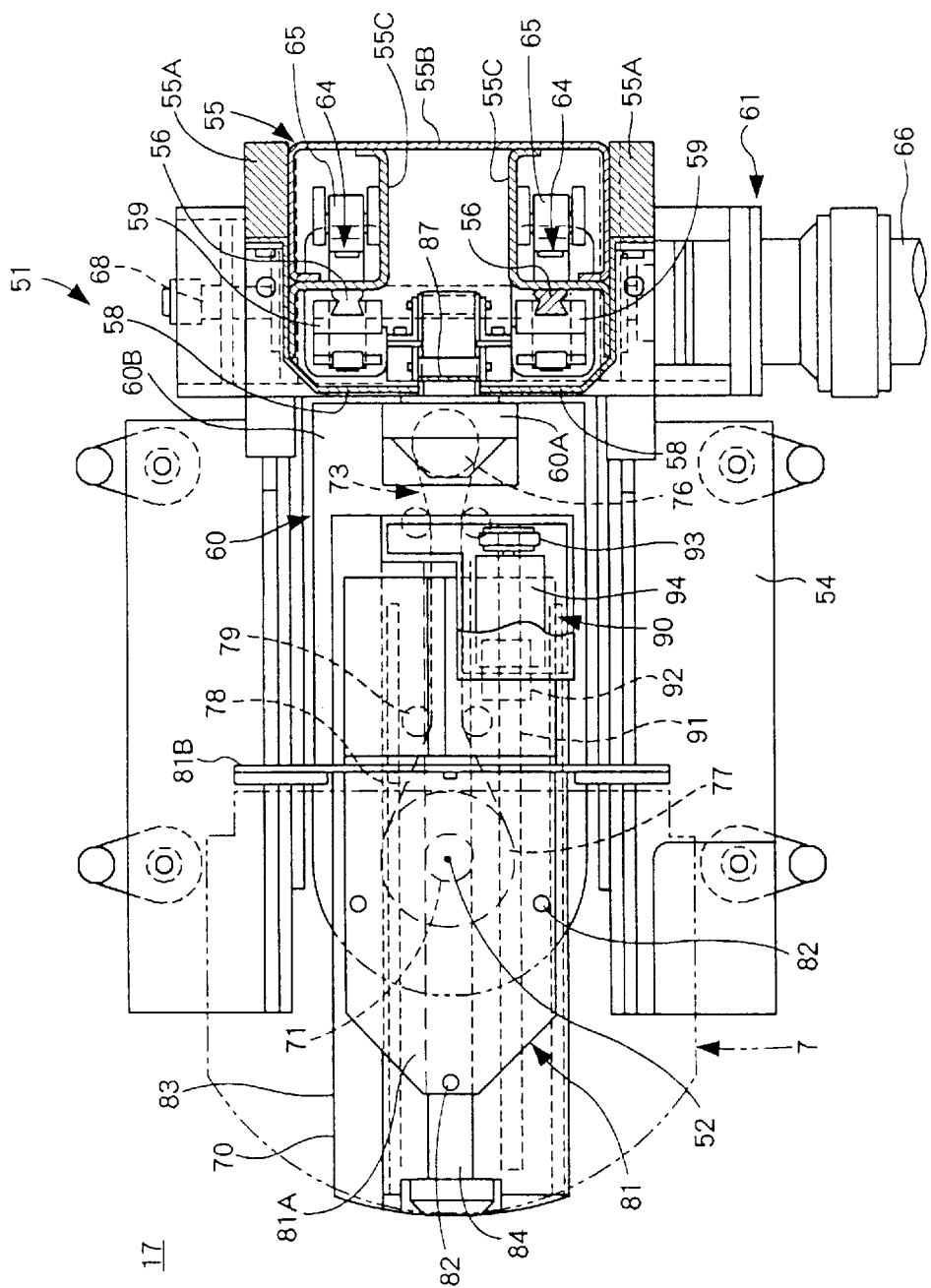
FIG. 8 is a top plan partially in section of the transferrer of the storage equipment.

In an exemplary embodiment, the transferrer 51 includes a base frame 54, which rests on the base plate 15 of the housing 11. A post 55 stands on the base frame 54 and is fitted with a pair of vertical guide rails 56 on its front side. As shown in FIG. 8, the post 55 consists of a pair of side members 55A, a rear member 55B connecting them, and a pair of front members 55C positioned on the front side of the rear member 55B. Each of the guide rails 56 extends on the front side of one of the front members 55C. Each of the front members 55C is fitted with a cover 58, which covers the associated rail 56. As shown in FIG. 7, the post 55 is also fitted with a top frame 57 on its top.

The transferrer 51 may also include a lift 60 with a pair of vertical sliders 59 each in slidable engagement with one of the vertical guide rails 56. The lift 60 can be moved vertically by a vertical driver 61. In the present embodiment, the lift 60 is L-shaped in side view, including a vertical member 60A and a horizontal member 60B. The vertical sliders 59 are fixed to the vertical member 60A, the lower end of which is fixed to the rear end of the horizontal member 60B. The vertical sliders 59 are connected to the vertical member 60A by a narrow part, which can move vertically between the covers 58.

In an exemplary embodiment, the vertical driver 61 includes a pair of driving pulleys 62, a pair of driven pulleys 63, a pair of timing belts (or chains, wire ropes or the like) 64, a pair of guide pulleys 65 and a rotational drive 66. Each pair of pulleys 62, 63 and 65 includes right and left pulleys.

The rotational drive 66 is coupled to the driving pulleys 62, which are supported within the base frame 54 at the bottom of the post 55. The driven pulleys 63 are supported within the top frame 57 at the top of the post 55. Each of the timing belts 64 connects one of the driving pulleys 62 and one of the driven pulleys 63. The guide pulleys 65 are supported near the driving pulleys 62 and each guide one of the timing belts 64.

Each of the timing belts 64 consists of a lower part 64A and an upper part 64B, which are in engagement with the associated driving and driven pulleys 62 and 63 respectively. Each of the timing belts 64 is connected to one of the vertical sliders 59, each of which is interposed between one end of the associated lower belt part 64A and one end of the associated upper belt part 64B. A tension adjuster 67 is interposed between the other ends of the parts 64A and 64B of each timing belt 64. The rotational drive 66 includes a reversible motor and a speed reducer. The rotational drive 66 also includes a driving shaft 68, to which the driving pulleys 62 are fixed.

The horizontal member 60B of the lift 60 supports a vertical shaft 71 on the vertical axis 52 with a bearing 72 interposed between them. The vertical shaft 71 supports a turner 70 fixed to it. The turner 70 may be rectangular in plan view and can be turned on the vertical axis 52 by an angular driver 73. The angular driver 73 includes a rotational drive 74, a driving pulley 76, a driven pulley 77, a timing belt (or a chain, a wire rope or the like) 78 and guide pulleys 79. The rotational drive 74 is mounted on the fixed end of the horizontal member 60B of the lift 60 and includes a driving shaft 75 extending downward from it. The driving and driven pulleys 76 and 77 are fixed to the driving and vertical shafts 75 and 71 respectively and connected by the timing belt 78. The guide pulleys 79 are supported by the horizontal member 60B. The rotational drive 74 includes a reversible motor and a speed reducer.

The carrier 81 of the transferrer 51 may take the form of a running fork comprising a horizontal supporting plate 81A, a positioning plate 81B and three positioning pins 82. The supporting plate 81A is supported on the turner 70 movably in parallel with the horizontal center line of the turner 70. The positioning plate 81B stands on a middle portion of the supporting plate 81A. The portion of the positioning plate 81A that is forward of the positioning plate 81B is a load support. The positioning pins 82 are fixed to peripheral points on the upper side of the load support. The carrier 81 can be protruded and retracted horizontally along the center line of the turner 70 by a horizontal driver 90.

The turner 70 is fitted with a pair of horizontal side members 83 and a horizontal guide rail 84 on its upper side. The side members 83 extend on both sides of and in parallel with the center line of the turner 70. The guide rail 84 extends through the vertical axis 52 between and in parallel with the side members 83. The rear end of the supporting plate 81A of the carrier 81 is fixed to the top of a horizontal slider 85, which is supported slidably on the guide rail 84. In an exemplary embodiment, the horizontal driver 90 includes a horizontal screw shaft 91, a nut 92 and a rotational drive 94. The screw shaft 91 is supported in parallel with the guide rail 84 by the turner 70 and is in engagement with the nut 92, which is fixed to the bottom of the supporting plate 81A. The rotational drive 94 is mounted on the rear end of the turner 70 and connected to the screw shaft 91 by a belt transmission 93. The rotational drive 94 includes a reversible motor and a speed reducer.

The load support of the carrier 81 is shaped and sized so that it can move vertically through the recess 34 of each turning shelf 32 of the rotary rack 21 when the lift 60 vertically moves with the carrier 81 protruded from the turner 70. As shown in FIG. 1, the cylindrical path 23 and the vertical plane 109 extending through the vertical axes 22 and 52 cross each other at a transfer position P. It is possible to shift each of the turning shelves 32 to the transfer position P by turning the rotary rack 21 on its axis 22. The transferrer 51 has a cylindrical path 53, which is coaxial with the vertical axis 52 and extends through the transfer position P. When the carrier 81 is most protruded from the turner 70, the load support of the carrier 81 is positioned on the cylindrical path 53. When the carrier 81 is most protruded and positioned in the transfer position P, its load support can move vertically through the recesses 34 of the turning shelves 32 in this position P. In FIG. 1, the carrier 81 is shown as positioned between its most protruded and most retracted positions.

The front side of the post 55 is fitted with a dust cover belt 87 for closing the space between the covers 58. The cover belt 87 should not prevent the lift 60 from vertically moving. The turner 70 is fitted with a dust cover belt 88 for closing the space over the guide rail 84. The cover belt 88 should not prevent the carrier 81 from horizontally protruding and retracting.

In an exemplary embodiment, the components and/or parts 54–94 compose the transferrer 51. The carrier 81 of the transferrer 51 can rotate around the vertical axis 52 and move vertically and radially about this axis 52.

As shown in FIGS. 1, 3, 9 and 10, the fixed racks 101 are arranged around the transferrer 51 in the storage chamber 17. Each of the fixed racks 101 includes fixed shelves 103 arranged vertically at regular intervals. One end of each fixed shelf 103 is fixed with connectors 104 to a horizontal supporting member 102, which is fixed to the framework 12 of the housing 11. The fixed shelves 103 protrude in the form of cantilevers horizontally toward the vertical axis 52.

The fixed shelves 103 may be identical in structure to the turning shelves 32 and each have a recess 105, which is open toward the vertical axis 52. In an exemplary embodiment, each fixed shelf 103 is fitted with three positioning pins 106 on its upper side around its recess 105. In other words, each fixed shelf 103 is equivalent to one turning shelf 32 that would have turned from the transfer position P around the vertical axis 52. The load support of the carrier 81 can move vertically through the recess 105 of each fixed shelf 103, as is the case with the turning shelves 32 in the transfer position P, when the lift 60 vertically moves with the carrier 81 most protruded from the turner 70. In an exemplary embodiment, the components and/or parts 102–106 compose the fixed racks 101, which may consist of other components and/or parts.

As shown in FIGS. 1–3 and 9–14, two port spaces 107 are formed each under one of the two fixed racks 101 far from the rotary rack 21. Each port space 107 may be equivalent in vertical size to the lowest three fixed shelves 103 of each of the other two fixed racks 101. The port spaces 107 are used for the formation of an inlet port 111a and an outlet port 111b. Loads can be transferred from the inlet port 111a to the transferrer 51, and from the transferrer 51 to the outlet port 111b.

Specifically, the lower wall 13 of the housing 11 may be formed with an inlet opening 110a and an outlet opening 110b both through it, each of which adjoins one of the port spaces 107. The ports 111a and 111b extend through the openings 110a and 110b respectively.

Each of the ports 111a and 111b may be fitted with a box frame 112, which extends through the associated housing opening 110a or 110b. The box frame 112 may be fitted with a temporary support 113 over an outer end portion thereof. The temporary support 113 may be one or two plates surrounding an operating space 114, and may be fitted with positioning pins 115 on its upper side. In an exemplary embodiment, as shown in FIGS. 1–3 and 9–14, three positioning pins 115 are used.

The box frame 112 houses a pair of horizontal guide rails 116, a carriage 117 and a horizontal driver 118. The guide rails 116 extend in parallel with the vertical plane 109 (FIG. 1), which extends through the vertical axes 22 and 52. The horizontal driver 118 reciprocates the carriage 117 on the guide rails 116 and consists of a drive 119 such as a motor, a timing pulley 121, a pair of guide pulleys 122 and a timing belt 123. The drive 119 may be mounted in the carriage 117 and includes a horizontal output shaft 120, to which the timing pulley 121 is fixed. The timing belt 123 extends in parallel with the guide rails 116 and is fixed at both ends to the box frame 112 with brackets 124. The guide pulleys 122 are supported by the carriage 117 to engage the timing belt 123 with the timing pulley 121.

In an exemplary embodiment, the carriage 117 includes a vertical driver 125, which consists of a bearing 126, a vertical screw shaft 127, a reversible drive 128 such as a motor, a transmission 130 such as a belt or a chain, a nut 131 and a guide 132. The screw shaft 127 is supported by the carriage 117 with the bearing 126 interposed between them. The reversible drive 128 is mounted in the carriage 117 and includes an output shaft 129 extending downward from it. The shafts 129 and 127 are in driving connection through the transmission 130. The screw shaft 127 and the nut 131 are in mutual engagement. The guide 132 guides the nut 131 moving vertically and prevents it from revolving. The nut 131 supports a lift 133.

The lift 133 is fitted with an angular driver 135, which consists of a supporting member 136, a bearing 137, a vertical shaft 138, a reversible drive 139 such as a motor or the like and a transmission 141 such as a belt or a chain or the like. The lift 133 supports the supporting member 136, which supports the vertical shaft 138 with the bearing 137 interposed between them. The supporting member 136 also supports the reversible drive 139, which includes an output shaft 140 extending upward. The shafts 140 and 138 are in driving connection through the transmission 141. The box frame 112 includes a top plate, which has a long opening. The vertical shaft 138 extends through the long opening and supports a load support 142 in the form of a horizontal plate on its top. The load support 142 can move horizontally into and out of and vertically through the operating space 114, which is surrounded by the temporary support 113. The load support 142 is fitted with positioning pins 142a on a peripheral portion of its upper side. In an exemplary embodiment, as shown in the figures, three positioning pins are used.

The top plate of the box frame 112 is fitted with positioning pins 143 near its inner end for positioning a load at a predetermined level over it. In an exemplary embodiment, as shown in the figures, three positioning pins are used. Each of the positioning pins 143 protrudes upward from a seat fixed to the top plate. The components and/or parts 112–145 compose the ports 111a and 111b, which may consist of other components and/or parts.

The outlet port 111b may be connected to a means of storage 151, which includes a box frame 152. The inner end of the box frame 152 may be connected to the outer side of the outer portion of the box frame 112 of the outlet port 111b. The box frame 152 may be fitted with a temporary support 153 over an outer end portion of it. The temporary support 153 is a plate surrounding an operating space 154, and is fitted with three positioning pins 155 on its upper side.

The box frame 152 houses a pair of horizontal guide rails 156, a carriage 157 and a horizontal driver 158. The guide rails 156 extend perpendicularly to the guide rails 116 of the ports 111a and 111b. The horizontal driver 158 reciprocates the carriage 157 on the guide rails 156. The horizontal driver 158 is similar to the horizontal drivers 118 of the ports 111a and 111b and, in the present embodiment, consists of a drive 159, an output shaft 160, a timing pulley 161, a pair of guide pulleys 162 and a timing belt 163. The timing belt 163 is fixed at both ends to the box frame 152 with brackets 164.

The carriage 157 includes a vertical driver 165, which is similar to the vertical drivers 125 of the ports 111a and 111b. The vertical driver 165, in the present embodiment, consists of a bearing 166, a vertical screw shaft 167, a drive 168, an output shaft 169, a transmission 170, a nut 171 and a guide 172. The nut 171 supports a lift 173, which supports a vertical shaft. This shaft supports a load support 174 in the form of a horizontal plate on its top. The load support 174 can move horizontally into and out of and vertically through the operating space 154, which is surrounded by the temporary support 153, and the operating space 114 of the outlet port 111b. The load support 174 is fitted with three positioning pins 174a on a peripheral portion of its upper side. The components and/or parts 152–174 compose the means of storage 151, which may consist of other components and/or parts.

The storage equipment 10 can store loads such as cassettes 7 for containing processed items. Each cassette 7 has bottom slots 8 formed for simultaneously engaging with inner and outer positioning pins 35, 82, 106, 115, 142a, 143, 155 and/or 174a when the cassettes 7 are transferred at various places. In the present embodiment, each cassette 7 has three bottom slots 8 formed for simultaneously engaging with inner and outer positioning pins.

As shown in FIGS. 1–3, the storage chamber 17 adjoins a clean room 5, which is defined by partitions 180. The partitions 180 and the housing walls 13 and 14 include common parts. Each of the ports 111a and 111b includes a transfer portion 148, which is an outer end portion positioned in the clean room 5.

The clean room 5 has a ceiling 1 with holes 3 formed through it. The clean room 5 also has a grating or porous floor 2 with holes or pores 4 formed through it. Clean air A is supplied through the ceiling holes 3 into the clean room 5, flows down through the room 5 and is sucked from it through the floor holes 4 to keep the room 5 clean.

The clean room 5 houses a lower conveyor 181 for conveying cassettes 7 to and from the storage equipment 10. In an exemplary embodiment, the lower conveyor 181 consists of a horizontal rail 182, a carriage 183 and a load holder 184. The horizontal rail 182 is supported over the transfer portions 148 of the ports 111a and 111b and supports the carriage 183, which is hung from the rail 182 and can automatically move along it. The load holder 184 is fitted to the bottom of the carriage 183 and includes a hanger or suspender 185, which can vertically move. The conveyor 181 moves along a conveying path 186, which extends over the transfer portions 148 of the ports 111a and 111b.

As shown in FIG. 2, the clean room 5 also houses an upper conveyor 191, which moves outside the housing 11 of the storage equipment 10. In an exemplary embodiment, the upper conveyor 191 consists of a horizontal rail 192, a carriage 193 and a load support 194. The horizontal rail 192 is supported under the ceiling 1 and supports the carriage 193, which can automatically move on the rail 192. The load support 194 rests on the carriage 193 and includes a transferrer, which may be a running fork.

The upper wall 14 of the housing 11 has a passage 195 formed through it near the rotary rack 21. Cassettes 7 can be transferred through the passage 195 between the rotary rack 21 and the upper conveyor 191. While the carriage 193 is stopped near the passage 195, the transferrer of the load support 194 can be actuated to transfer cassettes 7 through this passage 195 between this support 194 and any one of the turning shelves 32 at the stage adjacent to the passage 195.

In place of the transferrer of the load support 194 on the carriage 193, the passage 195 may be fitted with a transferrer in the form of a running fork or the like for transferring cassettes 7 between the load support 194 and the rotary rack 21. If the upper conveyor 191 is not necessary, it can be omitted.

In an exemplary embodiment, the storage equipment 10 can be used in the following way.

A cassette 7 handled in the clean room 5 can be stored in the storage equipment 10 by first being placed on the transfer portion 148 of the inlet port 111a. Specifically, the lower conveyor 181 places the cassette 7 on the temporary support 113 of the inlet port 111a, as shown with two-dot chain lines E in FIG. 11, in such a manner that outer end portions of the bottom slots 8 of this cassette engage with the positioning pins 115 of this support 113. Inner end portions of the bottom slots 8 engaging with the positioning pins 115 are positioned in the operating space 114 within the temporary support 113. In the meantime, the load support 142 of the inlet port 111a stands by in its lowest normal position under the operating space 114.

Next, the drive 128 of the vertical driver 125 of the inlet port 111a is activated to rotate the associated screw shaft 127 through the associated transmission 130, lifting the associated nut 131, lift 133 and angular driver 135. This lifts the load support 142 through the operating space 114, lifting the cassette 7 from the temporary support 113, as shown with two-dot chain lines in FIG. 12. The positioning pins 142a of the lifted support 142 engage with the inner end portions of the bottom slots 8 of the cassette 7.

Figure 9:
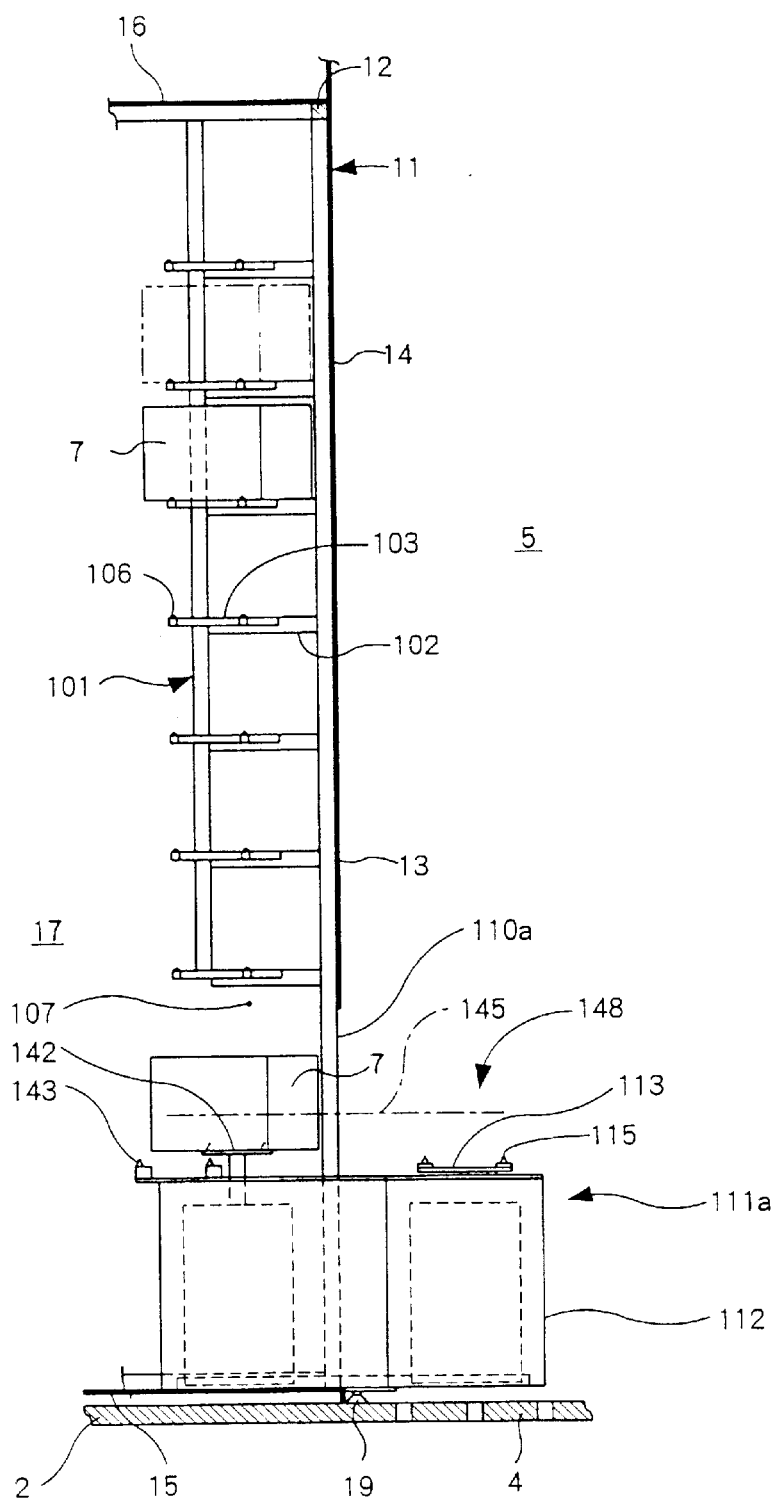
FIG. 9 is a side view of a fixed rack of the storage equipment.
Figure 10:
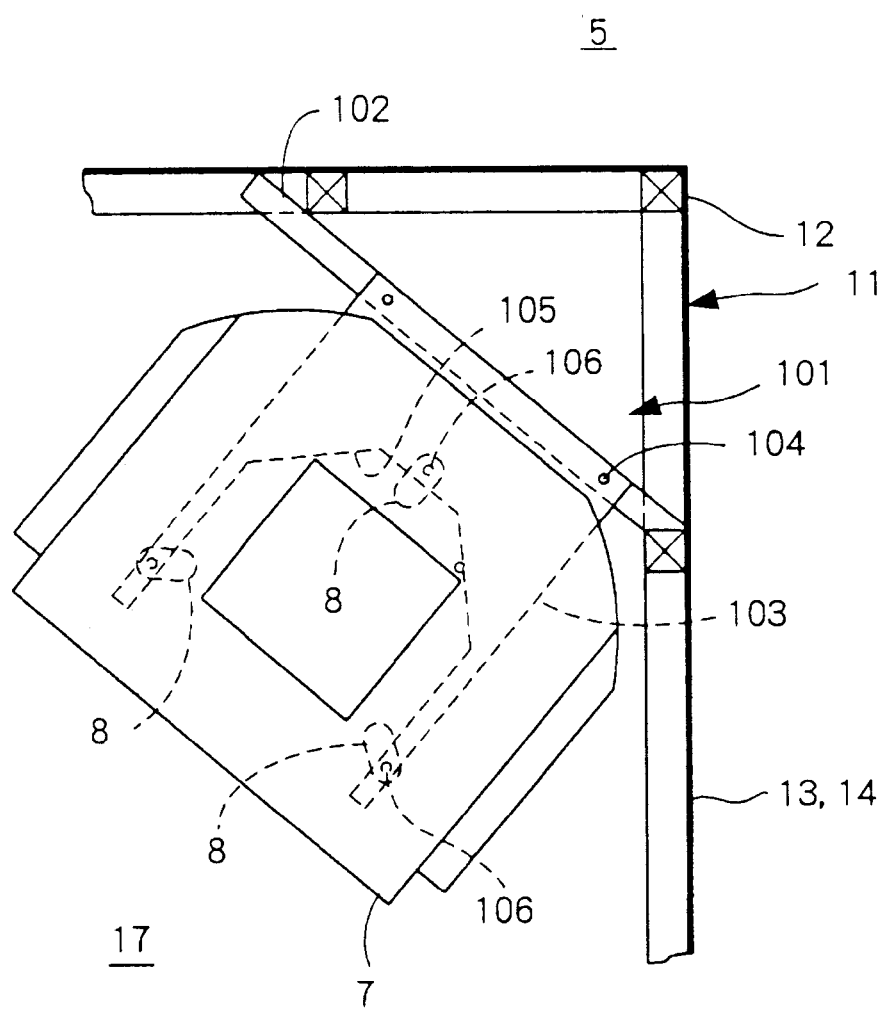
FIG. 10 is a top plan of a fixed rack of the storage equipment.

Next, the drive 119 of the horizontal driver 118 of the inlet port 111a is activated to rotate the associated timing pulley 121 so as to move the associated carriage 117 together with the lifted load support 142 along the associated guide rails 116 toward the inner end of the inlet port 111a. The moved load support 142 carries the cassette 7 on it through the inlet opening 110a into the storage chamber 17. The carriage 117 is moved until the cassette 7 on the load support 142 reaches a position F (FIG. 11) adjacent the inner end of the inlet port 111a. The position F is in the associated port space 107, as shown in FIG. 9.

Figure 11:
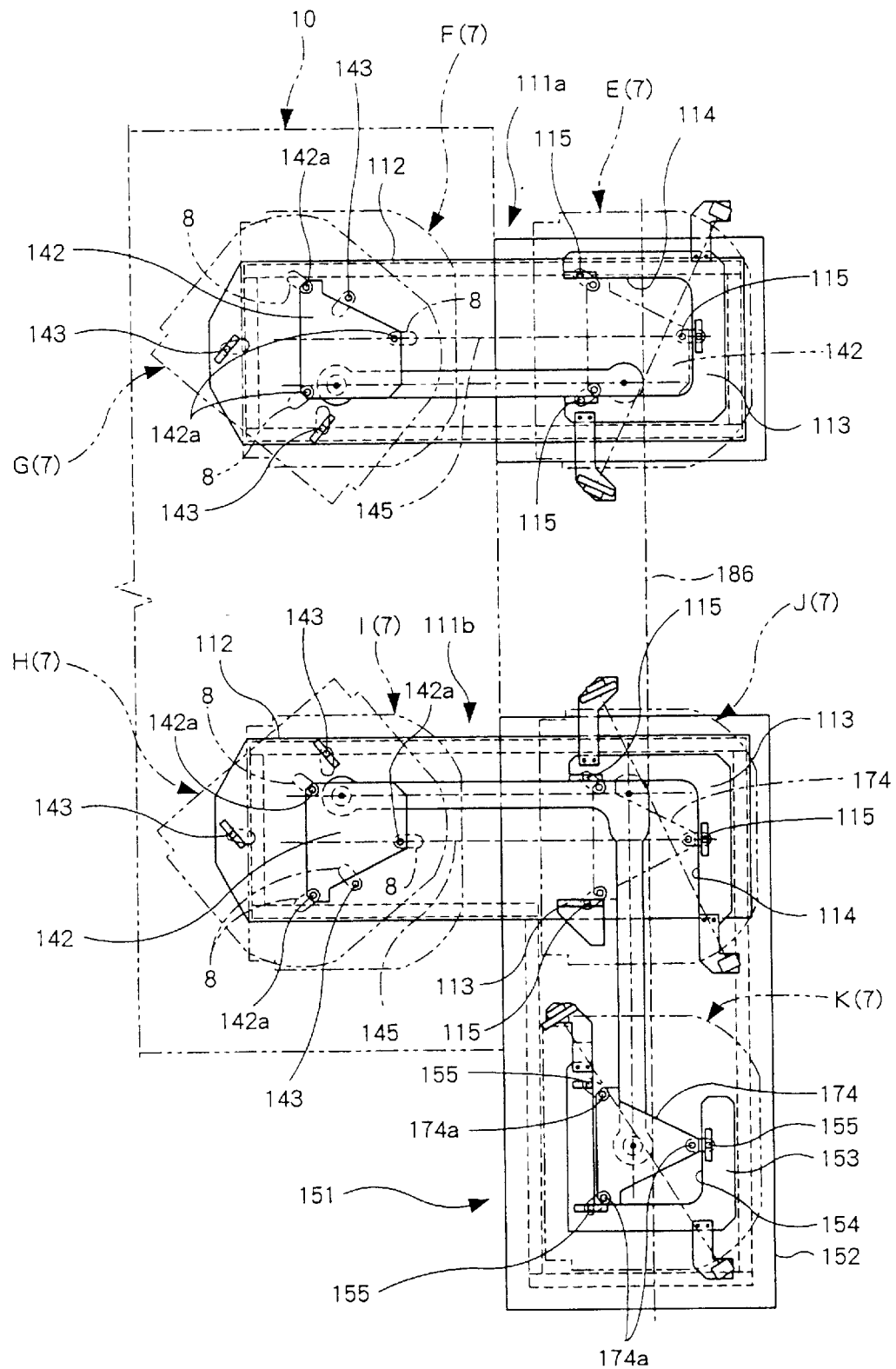
FIG. 11 is a schematic top plan of the inlet and outlet ports of the storage equipment.
Figure 12:
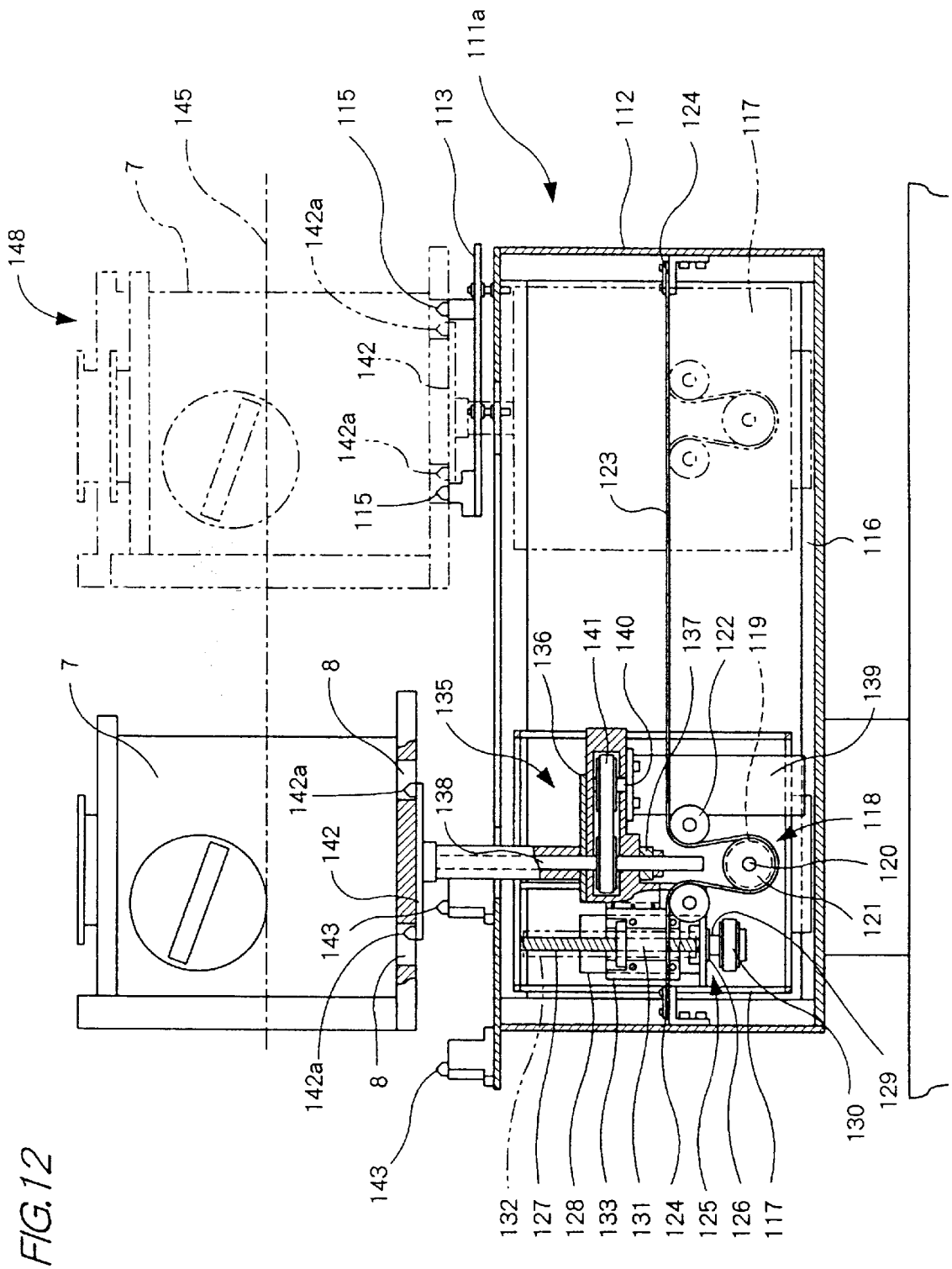
FIG. 12 is a side view partially in section of the inlet port of the storage equipment.
Figure 13:
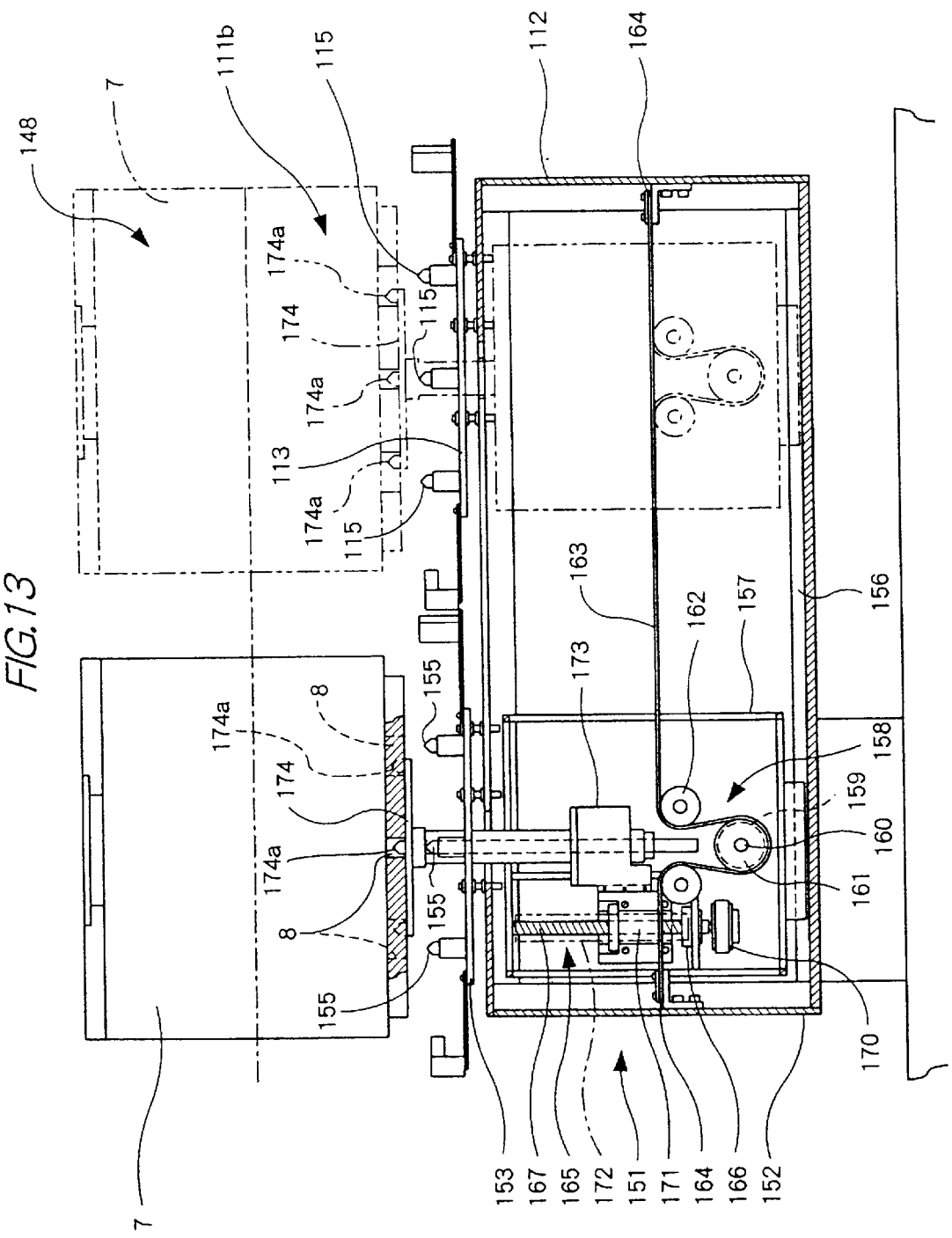
FIG. 13 is a front view partially in section of the outlet port of the storage equipment.
Figure 14:
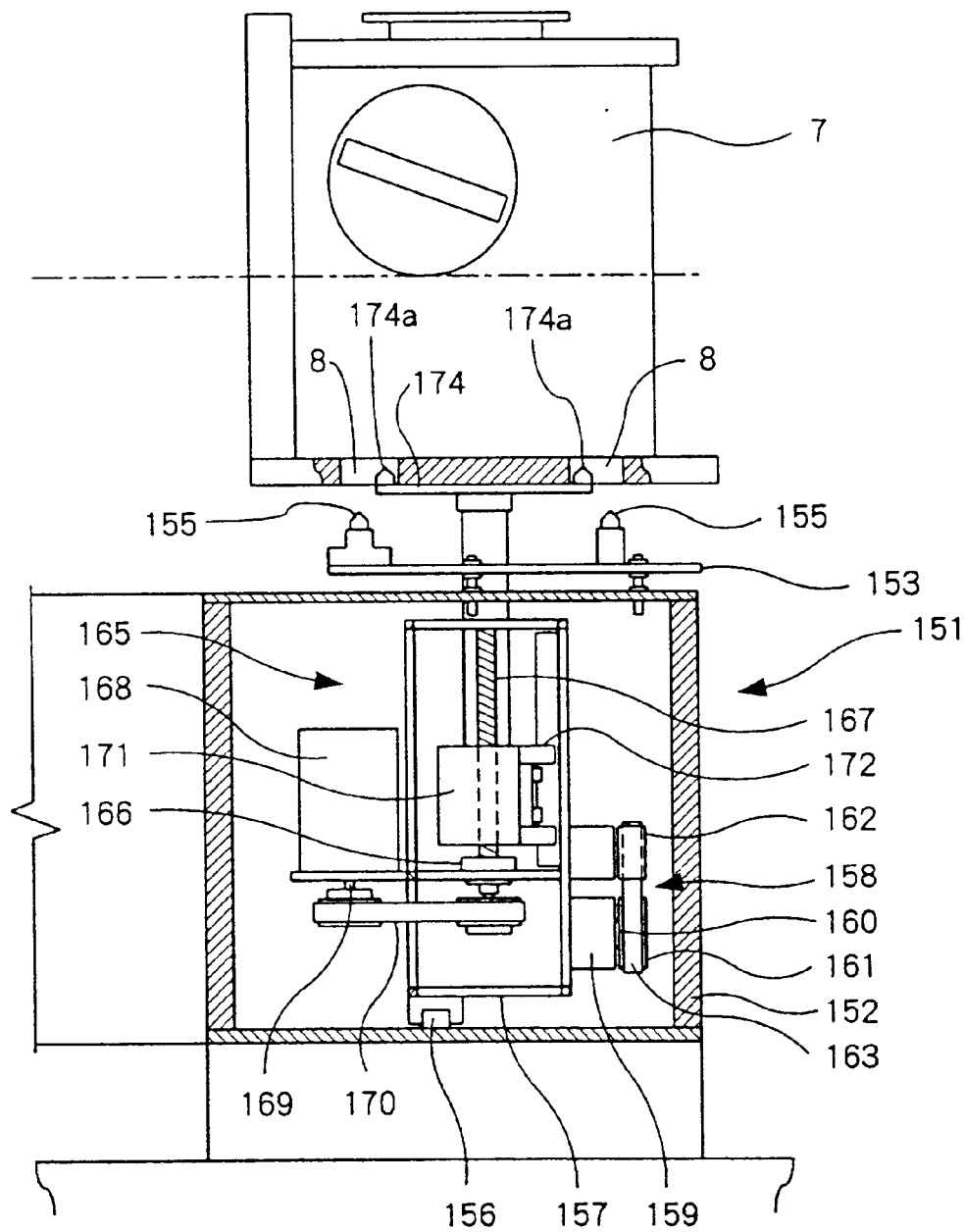
FIG. 14 is a side view partially in section of part of the outlet port of the storage equipment.

Next, the drive 139 of the angular driver 135 of the inlet port 111a is activated to drive the associated transmission 141, turning the associated vertical shaft 138 and the load support 142 to shift the cassette 7 in the position F to a position G (FIG. 11). The position G coincides vertically with the positions where cassettes 7 can be supported on fixed shelves 103 of the fixed rack 101 over the port space 107.

Next, the drive 128 of the vertical driver 125 is activated to rotate the screw shaft 127 in the opposite direction, lowering the nut 131 with the lift 133, the angular driver 135 and the load support 142. While the load support 142 is lowered inside the positioning pins 143 on the associated box frame 112, the outer end portions of the bottom slots 8 of the cassette 7 on this support 142 engage with the positioning pins 143. This positions the cassette 7 at a predetermined level over the top plate of the box frame 112. In the meantime, the load support 142 leaves the bottom of the cassette 7 and is lowered to its lowest position.

After the load support 142 is unloaded, the drive 139 of the angular driver 135 is actuated to turn the vertical shaft 138 in the opposite direction so as to return the support 142 to the normal position. Next, the drive 119 of the horizontal driver 118 is activated to rotate the timing pulley 121 in the opposite direction so as to move the carriage 117 together with the load support 142 to the transfer portion 148 of the inlet port 111a. This returns the load support 142 in the lowest normal position to the stand-by position under the operating space 114 within the temporary support 113. The return ends the process for carrying the cassette 7 into the storage chamber 17.

Thus, the cassette 7 is supported on the seats for the positioning pins 143 in the inner end portion of the inlet port 111a. The supported cassette 7 can be transferred to the transferrer 51, with the carrier 81 empty and retracted in its home position over the turner 70, as shown with solid lines in FIG. 6. Suitably as the need arises, the empty carrier 81 may be turned with the turner 70 and/or moved vertically with the lift 60 to shift to its receiving position adjacent to the inner end of the inlet port 111a.

The carrier 81 can be turned with the turner 70 in opposite directions around the vertical axis 52 by the rotational drive 74 of the angular driver 73 driving the driving shaft 75, the driving pulley 76, the timing belt 78, the driven pulley 77 and the vertical shaft 71.

The carrier 81 can be moved vertically with the vertical sliders 59 and the lift 60 moved along the vertical guide rails 56 by the rotational drive 66 of the vertical driver 61 driving the driving shaft 68, the driving pulleys 62 and the timing belts 64.

Thus, by turning and/or vertically moving the empty carrier 81 suitably as the need arises, it is possible to shift the carrier 81 to the receiving position, which is adjacent to the inner end of the inlet port 111a. The positioning pins 82 on the carrier 81 in the receiving position are slightly lower than the bottom of the cassette 7 supported on the seats for the positioning pins 143 on the box frame 112.

Figure 6:
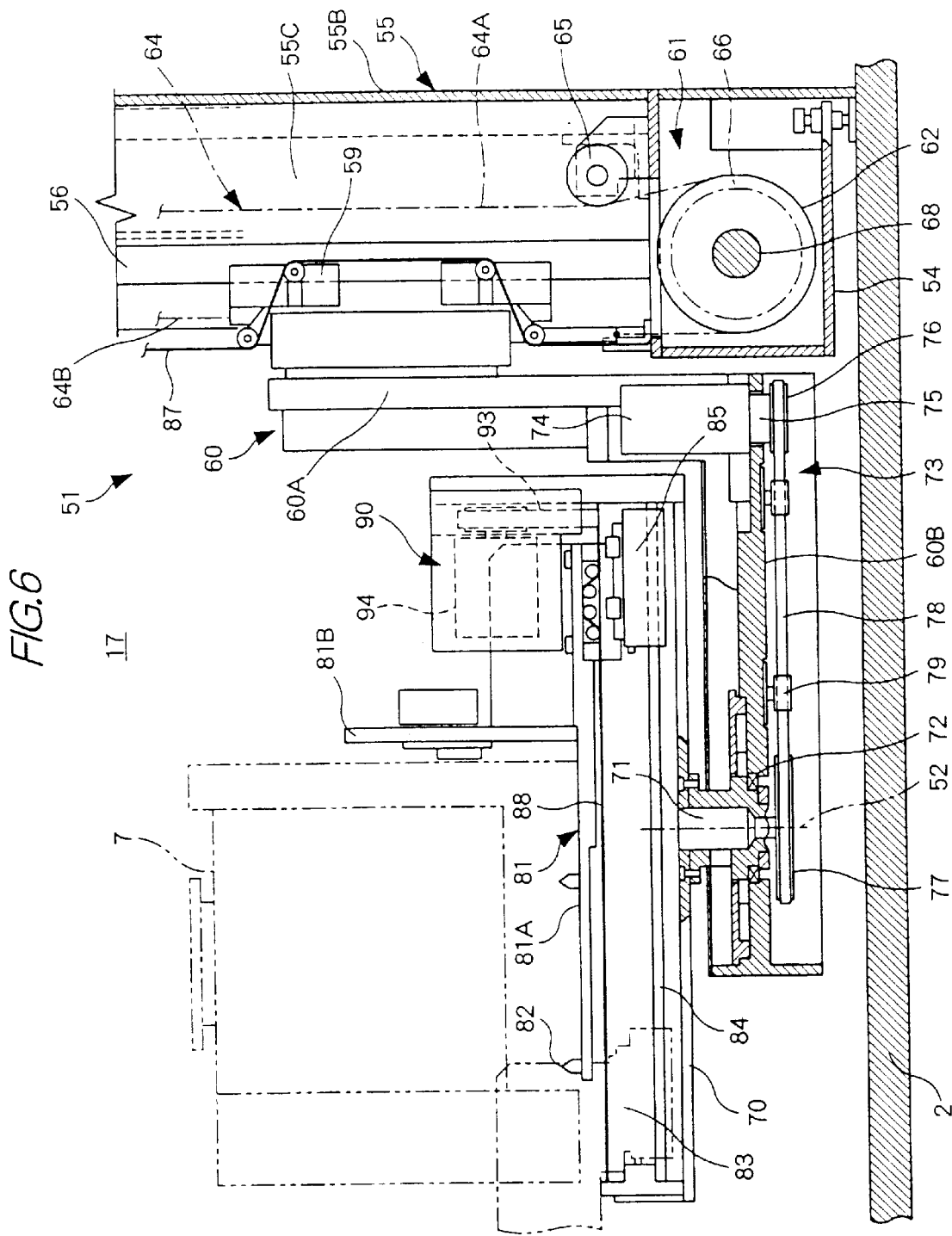
FIG. 6 is a side view partially in section of a lower portion of the transferrer of the storage equipment.

Next, the carrier 81 is protruded from its home position by being linearly moved with the horizontal slider 85 guided by the guide rail 85, to its most protruded position shown with two-dot chain lines in FIG. 6. The carrier 81 can be protruded by the rotational drive 94 of the horizontal driver 90 driving the belt transmission 93 and the screw shaft 91 to move the nut 92. The load support of the protruded carrier 81 is positioned just under the cassette 7 supported on the seats for the positioning pins 143 in the inner end portion of the inlet port 111a.

Next, the vertical driver 61 is activated to slightly lift the carrier 81 with the lift 60 so that the carrier 81 can support the cassette 7 with its positioning pins 82 engaging with the inner end portions of the bottom slots 8 of the cassette 7. In the meantime, the cassette slots 8 disengage upward from the positioning pins 143 on the box frame 112. Thereafter, the horizontal driver 90 is activated to retract the lifted carrier 81, moving the supported cassette 7 to a predetermined position over the turner 70.

Next, suitably as the need arises, the retracted carrier 81 is turned and/or vertically moved in the foregoing way to carry the cassette 7 on it to a sending position adjacent to a target fixed shelf 103 of the fixed racks 101. The bottom of the cassette 7 in the sending position is slightly higher than the positioning pins 106 of the fixed shelf 103.

Next, the carrier 81 is protruded from the turner 70 to send the cassette 7 on it to a predetermined position over the fixed shelf 103. The protruded carrier 81 is then lowered slightly to transfer the cassette 7 onto the fixed shelf 103 in such a manner that the outer end portions of the bottom slots 8 of the cassette 7 engage with the positioning pins 106 of the fixed shelf 103. In the meantime, the positioning pins 82 of the carrier 81 disengage downward from the cassette slots 8. The lowered empty carrier 81 is then retracted to its home position over the turner 70. The retraction ends the process for loading the fixed shelf 103.

Alternatively, the cassette 7 in the inner end portion of the inlet port 111a can be stored in the rotary rack 21. In this case, while the carrier 81 of the transferrer 51 is receiving the cassette 7 supported on the seats for the positioning pins 143 in the inner end portion of the inlet port 111a, the rotary rack 21 can be turned in advance for storage preparation.

The rotary rack 21 can be turned in opposite directions by the rotational drive 42 of the rack driver 41 driving the driving shaft 43, the driving gear 44, the ring gear 45 and the hexagonal hollow column 27. This turns the turning shelves 32 around the vertical axis 22. The rotary rack 21 is turned until a target turning shelf 32 reaches the transfer position P on the cylindrical path 23.

It is possible to shorten the required time for storage preparation by turning the rotary rack 21 within an angular range of 180 degrees in the direction for the smaller angle between the current position of the target turning shelf 32 and the transfer position P. It is also possible to raise the operating efficiency of the whole equipment by turning the rotary rack 21 in advance for storage preparation while the carrier 81 of the transferrer 51 is receiving the cassette 7 from the inlet port 111a. As a matter of course, if the target turning shelf 32 is already in the transfer position P, the rotary rack 21 does not need to turn.

Figure 5:
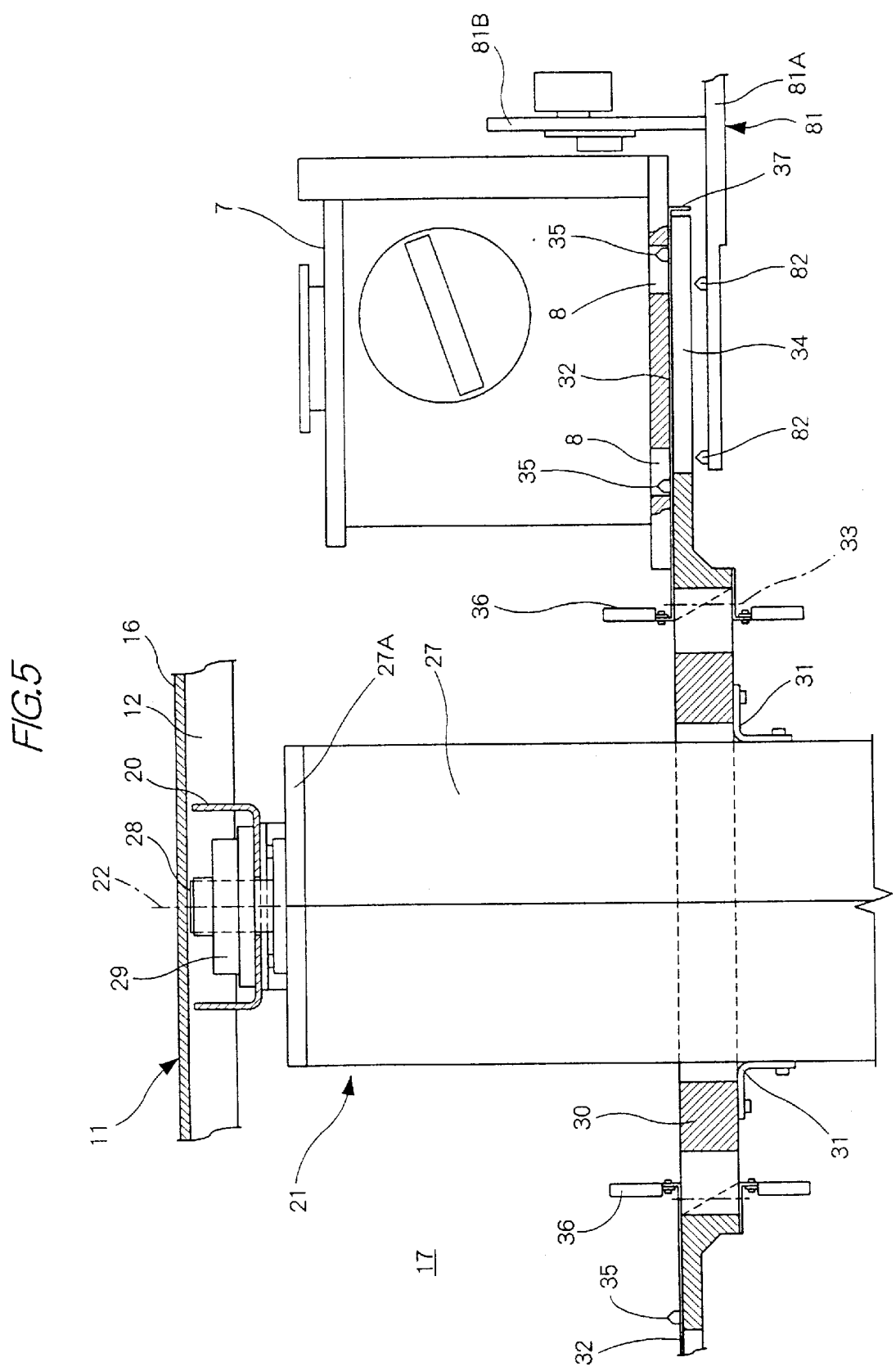
FIG. 5 is a side view partially in section of an upper portion of the rotary rack of the storage equipment.

After the target turning shelf 32 is turned to the transfer position P, where it stands by, the transferrer 51 can operate for it in a manner similar to that for the fixed shelves 103, in such a manner that the cassette 7 on the carrier 81 can be transferred onto the turning shelf 32, as shown in FIGS. 1 and 5. The outer end portions of the bottom slots 8 of the transferred cassette 7 engage with the positioning pins 35 on the turning shelf 32. The unloaded carrier 81 is then retracted from its position below the turning shelf 32 to its home position over the turner 70. The retraction ends the process for loading the turning shelf 32.

In an exemplary embodiment, the cassettes 7 supported on a target turning shelf 32 in the transfer position P and a target fixed shelf 103 can be carried to the outlet port 111b in the following way.

The transferrer 51 reverses its loading operation so that the carrier 81 can receive a cassette 7 from any one of the rotary and fixed racks 21 and 101. First, the carrier 81 is protruded to a lifting position under the cassette 7 on the target shelf 32 or 103. The protruded carrier 81 is then lifted to support the cassette 7. The lifted and loaded carrier 81 is then retracted to its home position over the turner 70. The retracted carrier 81 is then turned and/or vertically moved to a sending position adjacent to the inner end of the outlet port 111b. The bottom of the cassette 7 on the carrier 81 in the sending position is slightly higher than the positioning pins 143 of the outlet port 111b.

Next, the carrier 81 is protruded relative to the turner 70 to move the cassette 7 to a predetermined position over the positioning pins 143 of the outlet port 111b. The protruded carrier 81 is then lowered so that the seats for the positioning pins 143 can support the cassette 7, with these pins 143 engaging with the outer end portions of the bottom slots 8 of the supported cassette 7. In the meantime, the positioning pins 82 of the carrier 81 disengage downward from the cassette slots 8. The unloaded carrier 81 is then retracted to its home position. The retraction ends the process for carrying the cassette 7 from the target shelf 32 or 103 to the outlet port 111b.

Thereafter, the outlet port 111b operates reversely to the inlet port 111a to shift the cassette 7 on the seats for the positioning pins 143 onto the temporary support 113 in the outer end portion of the outlet port 111b. The cassette shift may require that the load support 142 of the outlet port 111b should in advance stand by in a receiving position, as shown with two-dot chain lines H in FIG. 11, just under the cassette 7 supported on the seats for the positioning pins 143. The load support 142 is then lifted slightly to support the cassette 7, with its positioning pins 142a engaging with the inner end portions of the bottom slots 8 of the cassette 7. In the meantime, the cassette slots 8 disengage upward from the positioning pins 143 of the outlet port 111b.

Next, the loaded load support 142 is turned to a normal position as shown with two-dot chain lines 1 in FIG. 11. Thereafter, the associated carriage 117 is moved together with the load support 142 along the guide rails 116 to the outer end portion of the outlet port 111b. The moved load support 142 carries the cassette 7 on it through the outlet opening 110b out of the storage chamber 17. When the load support 142 reaches a predetermined position in the outer end portion of the outlet port 111b and stops there, this support 142 is positioned just above the associated temporary support 113. The positioned load support 142 is then lowered through the operating space 114 within the temporary support 113 to its lowest position. This transfers the cassette 7 on the load support 142 to the temporary support 113 in such a manner that the outer end portions of the bottom slots 8 of the cassette 7 can engage with the positioning pins 115 on the temporary support 113. In the meantime, the positioning pins 142a of the load support 142 disengage downward from the cassette slots 8. This ends the process for carrying the cassette 7 out of the storage chamber 17.

Part of the loading process and part of the unloading process may be combined to transfer cassettes 7 from the fixed racks 101 to any turning shelves 32, and from the rotary rack 21 to any fixed shelves 103, by means of the transferrer 51. There may be a need to transfer the cassette 7 on one of the fixed shelves 103 to one of the turning shelves 32 outside the transfer position P. In this case, it is possible to raise the operating efficiency of the whole equipment by turning the rotary rack 21 in advance for storage preparation while the transferrer 51 is receiving the cassette 7 from the fixed shelf 103.

The means of storage 151 enables the cassette 7 on the temporary support 113 of the outer end portion of the outlet port 111b to temporarily stand by. For example, first, the carriage 157 of the means of storage 151 is moved to the outlet port 111b to shift the load support 174 in its lowest position to a predetermined position under the operating space 114 within the temporary support 113. As shown with two-dot chain lines in FIG. 13, the shifted load support 174 is then lifted to support the cassette 7 in such a manner that the positioning pins 174a on this support 174 can engage with the inner end portions of the bottom slots 8 of the cassette 7. In the meantime, the cassette slots 8 disengage upward from the positioning pins 115 on the temporary support 113. Thereafter, the carriage 157 is moved with the loaded load support 174 toward the outer end of the means of storage 151 to carry the cassette 7 on it to a predetermined position over the temporary support 153 of the means of storage 151, as shown with two-dot chain lines K in FIG. 11 and solid lines in FIG. 13, and in FIG. 14.

Next, the loaded load support 174 is lowered through the operating space 154 within the temporary support 153 to transfer the cassette 7 onto the temporary support 153 in such a manner that the outer end portions of the cassette slots 8 can engage with the positioning pins 155 on the temporary support 153. In the meantime, the positioning pins 174a on the load support 174 disengage downward from the cassette slots 8. In the exemplary embodiment, this ends the process for making the cassette 7 stand by temporarily on the means of storage 151.

During the foregoing processes, the bottom slots 7 of each cassette 7 can engage with the positioning pins 35, 82, 106, 115, 142a, 143, 155 or 174a. This prevents the cassette 7 from falling down or shifting out of position with centrifugal force or otherwise while the cassette is turning.

The cassette 7 supported on the temporary support 113 or 153 of the outlet port 111b or the means of storage 151 can be conveyed to a desired place by the lower conveyor 181, which can also convey a cassette 7 to the inlet port 111a. For example, first, the carriage 183 of the conveyor 181 is moved along the conveying path 186 and stopped over the cassette 7 supported on the temporary support 113 or 153.

Next, the hanger 185 is lowered, holds the cassette 7 and is then lifted to hang it up so that the load holder 184 of the carriage 183 can hold it. The carriage 183 is then moved along the conveying path 186 to convey the held cassette 7 to the desired place.

FIG. 15(a) shows load storage equipment according to a second embodiment of the present invention. This storage equipment includes two rotary racks 21, a transferrer 51, one (or more) fixed rack 101, an inlet port 111a and an outlet port 111b. Each of the rotary racks 21 has a vertical axis 22 and a cylindrical path 23 coaxial with this axis. The transferrer 51 has a vertical axis 52 and a cylindrical path 53 coaxial with this axis. The three vertical axes 22 and 52 extend on a vertical plane 109. The transferrer 51 is interposed between the rotary racks 21. The fixed rack 101 is positioned on the cylindrical path 53 of the transferrer 51. The inner end portions of the ports 111a and 111b are positioned in a lower space formed in one of the rotary racks 21. The ports 111a and 111b are so oriented that loads can be carried into and out of the storage equipment in the horizontal directions 145 parallel to the vertical plane 109. Each of the rotary racks 21 has a transfer position P, where loads can be transferred between the rack 21 and the transferrer 51. Each cylindrical path 23 is in contact with the cylindrical path 53 at the associated transfer position P.

FIG. 15(b) shows load storage equipment according to a third embodiment, which is a modification of the second, of the present invention. This storage equipment includes two rotary racks 21, a transferrer 51 and two (or more) fixed racks 101. The vertical axis 22 of each rotary rack 21 and the vertical axis 52 of the transferrer 51 extend on a vertical plane 109. The two vertical planes 109 make an angle with each other.

FIG. 15(c) shows load storage equipment according to a fourth embodiment, which is a modification of the second shown in FIG. 15(a), of the present invention. This storage equipment includes three rotary racks 21, a transferrer 51 and two (or more) fixed racks 101. The transferrer 51 is interposed between two of the rotary racks 21, the other of which is positioned on one side of the transferrer 51. The fixed racks 101 are positioned on the cylindrical path 53 and the other side of the transferrer 51. As is the case with the second embodiment, each of the rotary racks 21 has a transfer position P, where loads can be transferred between the rack 21 and the transferrer 51.

In the storage equipment according to the second, third or fourth embodiment, the inner end portions of the ports 111a and 111b are positioned in the lower space in one the rotary racks 21. Because no load can be transferred directly between each of the ports 111a and 111b and the transferrer 51 of this equipment, the equipment includes an exclusive transferrer (not shown) for transferring a load between each of the ports 111a and 111b and a turning shelf 32 positioned at the same stage where the ports are. The transferrer 51 can transfer loads via the turning shelves 32 at this stage to and from the ports 111a and 111b.

FIG. 16(a) shows load storage equipment according to a fifth embodiment of the present invention. This storage equipment includes a rotary rack 21, two transferrers 51, eight (or some) fixed racks 101, an inlet port 111a and an outlet port 111b. The rotary rack 21 is supported on one side of the position between the transferrers 51. Each of the transferrers 51 has a vertical axis 52 and a cylindrical path 53 coaxial with this axis. Four of the fixed racks 101 are positioned on each cylindrical path 53. The inner end portion of each of the ports 111a and 111b is positioned in a lower space formed in one of the fixed racks 101 on one of the cylindrical paths 53. The ports 111a and 111b are so oriented that loads can be carried into and out of the storage equipment in the horizontal directions 145 parallel to the vertical plane on which the transferrer axes 52 extend. The rotary rack 21 has two transfer positions P, in each of which loads can be transferred between the rack 21 and one of the transferrers 51.

FIG. 16(b) shows load storage equipment according to a sixth embodiment of the present invention. This storage equipment includes a first rotary rack 21, a second rotary rack 21, a first transferrer 51 and a second transferrer 51. The first rotary rack 21 and the first transferrer 51 are arranged in the same positions as in the first embodiment. The second rotary rack 21 is supported on one side of the first transferrer 51. The second transferrer 51 is positioned on one side of the first rotary rack 21 and adjoins the second rotary rack 21. Each of the transferrers 51 has a vertical axis 52 and a cylindrical path 53 coaxial with this axis. The storage equipment also includes six (or some) fixed racks 101, three of which are positioned on each cylindrical path 53. Each of the rotary racks 21 has two transfer positions P, in each of which loads can be transferred between the rack 21 and one of the transferrers 51.

In the storage equipment according to the first embodiment, the lift 60 supports the turner 70, which supports the carrier 81 in such a manner that the carrier can protrude and retract. The lift 60 does not turn, but the turner 70 can turn on the vertical axis 52. Alternatively, the base frame 54 of the transferrer 51 may be supported rotatably around the vertical axis 52 so that the whole transferrer could turn on this axis.

The carrier 81 of the transferrer 51 is designed to support the bottom of a cassette 7. Alternatively, the carrier 81 may be designed to hold a cassette 7 in such a manner that the cassette could hang from the carrier. Otherwise, each cassette 7 may include one or more parts protruding from sides or the top of it, and the carrier 81 may be designed to engage with the protruding part or parts.

In an exemplary embodiment, the number of fixed racks 101 around the transferrer 51 is four, but may be one, two, three, five or more, depending on the available space in the storage chamber 17.

The rotary rack 21 of this equipment is designed to turn within the angular range of 180 degrees in each direction, but may be designed to turn within an angular range larger than 180 degrees in each direction, or to turn in only one direction.

It is preferable that each of the inlet and outlet ports 111a and 111b be positioned at one of the fixed racks 101. If there are three or more fixed racks 101, as is the case with the first embodiment, each of the ports 111a and 111b can be positioned at any one of the fixed racks 101. As the need arises, two or more inlet ports 111a and two or more outlet ports 111b may be provided for one load storage equipment. Regardless of the number of fixed racks 101, both ports 111a and 111b may be positioned at one of them. The ports 111a and 111b may be replaced by one port. Of course, if an exclusive transferrer were provided, as stated already, the ports 111a and 111b may be positioned at the rotary rack 21. The ports 111a and 111b may be positioned horizontally away from the rotary and fixed racks 21 and 101 in such a manner that loads could be transferred between each of the ports and the carrier 81 of the transferrer 51.

The structure of the ports 111a and 111b is not limited to that of the first embodiment. The ports 111a and 111b may be fitted with roller conveyors or vertically movable belt conveyors.

The storage equipment according to each of the embodiments includes a means of storage 151, which is connected to the outlet port 111b, and which may be omitted. Another means of storage may be connected to the inlet port 111a.

In the storage equipment according to each of the embodiments, the inlet and outlet ports 111a and 111b are so oriented that they can carry loads in the opposite directions 145. This may require a means for shifting the load in the inner end portion of each of the inlet and outlet ports 111a and 111b between the position facing toward the associated second vertical axis 52 and the position facing in the direction in which the load can be carried into or out of the associated storage chamber 17. Alternatively, the ports 111a and 111b may be positioned radially of the second vertical axis 52. It is preferable that some lower or lowest stages of turning shelves 32 or fixed shelves 103 of the associated rack/s 21 or 101 be replaced with a space, where the inner end portions of the ports 111a and 111b are positioned. Alternatively, some middle or upper stages of turning shelves 32 or fixed shelves 103 may be replaced with a space for the ports 111a and 111b.

In the storage equipment according to each of the embodiments, the rotary and fixed racks 21 and 101 and the transferrer 51 are positioned in the storage chamber 17, which is defined in the housing 11, and loads can be carried through the inlet and outlet ports 111a and 111b between the chamber 17 and the clean room 5 outside this chamber. Alternatively, clean air A may be supplied to the storage chamber 17 to keep it clean. Otherwise, the storage chamber 17 may be omitted, and the racks 21 and 101 and the transferrer 51 may be positioned directly in the clean room 5.

In the storage equipment according to each of the embodiments, the walls 13 and 14 of the storage chamber 17 and the partitions 180 of the clean room 5 may include common parts. This enables the storage equipment to be produced with fewer parts at lower cost. This also enables the chamber walls 13 and 14 and the room partitions 180 to be mutually reinforced. Alternatively, the chamber walls 13 and 14 and the room partitions 180 may be independently provided. The independent partitions 180 would have inlet and outlet openings formed through them for loads.

In the storage equipment according to each of the embodiments, the lower conveyor 181 may be supported under the ceiling and conveys cassettes 7 to and from the storage equipment 10. Alternatively, cassettes 7 may be conveyed by a car type conveyor that can travel automatically on the floor, a carriage that can be pushed manually on the floor, or another conveyor positioned on the floor. As a matter of course, cassettes 7 may be conveyed manually, in place of the conveyor, in the clean room 5 to the inlet port 111a and from the outlet port 111b.

The storage equipment according to each of the embodiments can store cassettes 7 in the form of containers, but could store other loads in any form, such as carrying, transporting pallets or the like.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A load storage system comprising:
    at least one rotary rack; the rotary rack including a plurality of vertically arranged stages of turning load supports that can rotate about a first vertical axis;
    a transferrer positioned adjacent to the rotary rack and including a carrier that can rotate about a second vertical axis and move vertically;
    at least one fixed rack positioned around the transferrer and including a plurality of vertically arranged stages of fixed load supports;
    an inlet-outlet port overlapping in plan view with at least one of the rotary rack and fixed rack;
    the transferrer adapted to transfer loads between the carrier and any one of the turning load supports and fixed load supports, and between the carrier and the inlet-outlet port, by means of turning and vertical movement of the carrier, or by means of the turning and vertical movement of the carrier and turning of the turning load supports.

2. A load storage system according to claim 1 wherein the inlet-outlet port overlaps with the fixed rack in plan view in such a manner that loads can be transferred directly between the port and the carrier of the transferrer.

3. A load storage system according to claim 2 wherein the first and second vertical axes extend in a vertical plane;
    the fixed rack including at least two fixed racks, at least one of which is positioned on each of a side of the vertical plane;
    the inlet-outlet port including an inlet port and an outlet port each overlapping in plan view with one of the fixed racks, the ports arranged in parallel with each other in such a manner that loads can be carried there through in directions parallel to the vertical plane.

4. A load storage system according to claim 3 wherein each of the inlet and outlet ports includes an inner end portion overlapping in plan view with one of the fixed racks, and wherein a load in the end portion can be shifted between an angular position parallel with the vertical plane and an angular position where the load can be transferred between the port and the carrier of the transferrer.

5. A load storage system according to claim 1 wherein the transferrer further includes:

a fixed post;

a lift vertically movable along the fixed post; and a turner supported by the lift and rotatable about the second vertical axis;

the carrier supported by the turner in such a manner that the carrier can protrude and retract radially from the second vertical axis;

wherein a load can be transferred between the carrier and each of the turning and fixed load supports by the protrusion, retraction or vertical movement of the carrier.

6. A load storage system according to claim 5 wherein the load can be transferred between the carrier and each of the turning and fixed load supports by the protrusion and retraction of the carrier.

7. A load storage system according to claim 5 wherein the load can be transferred between the carrier and each of the turning and fixed load supports by the protrusion, retraction and verticl movement of the carrier.

8. A load storage system according to claim 5 wherein the load can be transferred between the carrier and each of the turning and fixed load supports by the protrusion and vertical movement of the carrier.

9. A load storage system according to claim 5 wherein the load can be transferred between the carrier and each of the turning and fixed load supports by the retraction and vertical movement of the carrier.

10. A load storage system according to claim 7 wherein at least one of the loads has a bottom with an engaging means;

the carrier comprising a horizontal plate;

at least one of the turning load supports and fixed load supports comprising a shelf having a recess through which the carrier can vertically move when the carrier has protruded;

at least one of the turning load supports having a first positioning pin protruding upward therefrom for engagement with the engaging means of the loads;

the carrier having a second positioning pin protruding upward therefrom for engagement with the engaging means of the loads;

at least one of the fixed load supports having a third positioning pin protruding upward therefrom for engagement with the engaging means of the loads.

11. A load storage system according to claim 10 wherein the engaging means of each load is a bottom slot;

the second positioning pin located on a peripheral portion of the carrier;

the first and third positioning pins each located in a position that is near to the second positioning pin when the carrier is positioned in the recess of one the load supports;

the bottom slot adapted to engage with the second positioning pin and one of the first and third positioning pins at the same time.

12. A load storage system according to claim 10 wherein the load supports of the rotary rack and fixed rack are similar in shape, and wherein the first and third positioning pins are similar in shape.

13. A load storage system according to claim 11 wherein the load supports of the rotary rack and fixed rack are similar in shape, and wherein the first and third positioning pins are similar in shape.

14. A load storage system according to claim 1 wherein the rotary rack and fixed rack and the transferrer are positioned in a storage chamber defined in a housing, and wherein loads can be carried through inlet and outlet ports between the storage chamber and a clean room outside the chamber.

15. A load storage system according to claim 5 wherein the rotary rack and fixed rack and the transferrer are positioned in a storage chamber defined in a housing, and wherein loads can be carried through inlet and outlet ports between the storage chamber and a clean room outside the chamber.

16. A load storage system according to claim 6 wherein the rotary rack and fixed rack and the transferrer are positioned in a storage chamber defined in a housing, and wherein loads can be carried through inlet and outlet ports between the storage chamber and a clean room outside the chamber.

17. A load storage system according to claim 7 wherein the rotary rack and fixed rack and the transferrer are positioned in a storage chamber defined in a housing, and wherein loads can be carried through inlet and outlet ports between the storage chamber and a clean room outside the chamber.

18. A load storage system according to claim 8 wherein the rotary rack and fixed rack and the transferrer are positioned in a storage chamber defined in a housing, and wherein loads can be carried through inlet and outlet ports between the storage chamber and a clean room outside the chamber.

* * * * *